(12) United States Patent
Tanaka

(10) Patent No.: US 9,678,561 B2
(45) Date of Patent: Jun. 13, 2017

(54) INFORMATION PROCESSING APPARATUS

(71) Applicant: Satoshi Tanaka, Tokyo (JP)

(72) Inventor: Satoshi Tanaka, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 422 days.

(21) Appl. No.: 14/036,395

(22) Filed: Sep. 25, 2013

(65) Prior Publication Data

US 2014/0101433 A1    Apr. 10, 2014

(30) Foreign Application Priority Data

Oct. 9, 2012 (JP) ................... 2012-224556
Apr. 2, 2013 (JP) ................... 2013-076993

(51) Int. Cl.
*G06F 1/32* (2006.01)

(52) U.S. Cl.
CPC .......... *G06F 1/3234* (2013.01); *G06F 1/3284* (2013.01); *G06F 1/3293* (2013.01); *Y02B 60/121* (2013.01); *Y02B 60/1267* (2013.01)

(58) Field of Classification Search
CPC .................................................. G06F 1/3234
USPC ........................................................ 713/100
See application file for complete search history.

(56) References Cited

U.S. PATENT DOCUMENTS

| 2007/0165262 A1 | 7/2007 | Watanabe et al. |
| 2007/0206211 A1 | 9/2007 | Okutsu et al. |
| 2009/0207423 A1 | 8/2009 | Shimizu et al. |
| 2010/0127076 A1* | 5/2010 | Hashimoto ............ B41J 29/393 235/382 |
| 2010/0188686 A1* | 7/2010 | Konno .................... G06K 15/00 358/1.14 |
| 2012/0013929 A1* | 1/2012 | Otaki .................... G06F 9/5094 358/1.13 |

(Continued)

FOREIGN PATENT DOCUMENTS

| JP | 2006-092481 | 4/2006 |
| JP | 2007-194876 A | 8/2007 |

(Continued)

OTHER PUBLICATIONS

U.S. Appl. No. 13/755,375, filed on Jan. 31, 2013.

(Continued)

*Primary Examiner* — Jaweed A Abbaszadeh
*Assistant Examiner* — Sumil Desai
(74) *Attorney, Agent, or Firm* — Harness, Dickey & Pierce, P.L.C.

(57) ABSTRACT

In the invention, a first processor that controls operation of a predetermined controlled unit and a second processor are operated in a first mode, a second mode, and a third mode, in the first mode the first processor and second processor are operable respectively, in the second mode respective amounts of power supplied to the first and second processors are lower than that in the first mode, in the third mode respective amounts of power supplied to the first and second processors are an amount between that in the first mode and that in the second mode and at least the predetermined controlled unit is operable, and in the second mode, the first processor puts a process related to the first processor before a process related to the second processor until the second mode is transited to the third mode.

20 Claims, 16 Drawing Sheets

(56) References Cited

U.S. PATENT DOCUMENTS

| | | | |
|---|---|---|---|
| 2012/0154851 A1* | 6/2012 | Rothery | G06F 1/1632 358/1.15 |
| 2012/0218597 A1 | 8/2012 | Hashimoto | |
| 2013/0036319 A1 | 2/2013 | Tanaka | |
| 2013/0061075 A1 | 3/2013 | Hashimoto | |

FOREIGN PATENT DOCUMENTS

| | | |
|---|---|---|
| JP | 2008-229989 | 10/2008 |
| JP | 2009-223866 A | 10/2009 |
| JP | 2009-288971 | 12/2009 |
| JP | 2010-128090 | 6/2010 |

OTHER PUBLICATIONS

Extended European Search Report for corresponding European Patent Application No. 13187603.9 issued on Jul. 19, 2016.
Office Action for Corresponding Japanese Patent Application No. 2013-076993 issued on Feb. 7, 2017.

\* cited by examiner

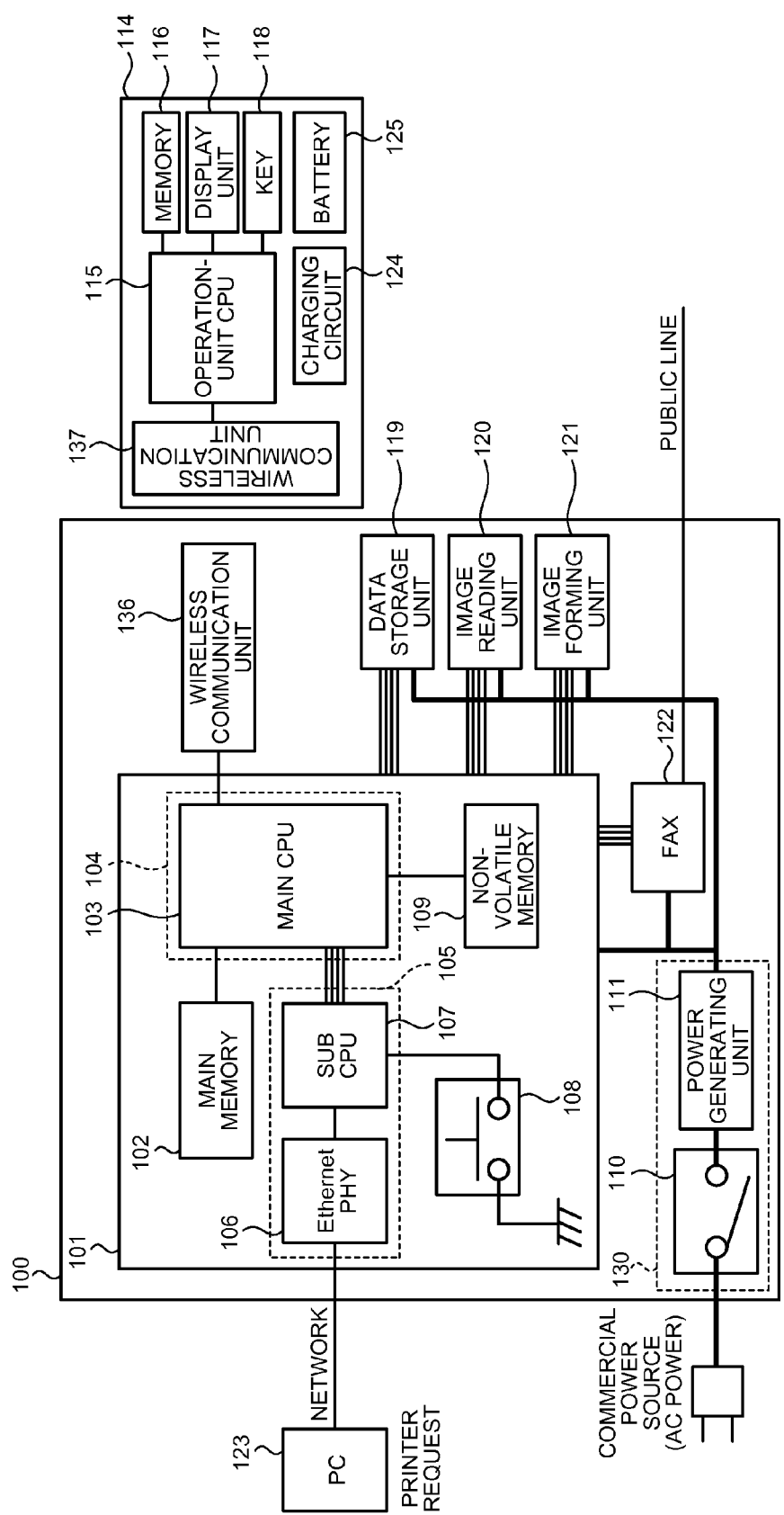

INFORMATION PROCESSING APPARATUS

CROSS-REFERENCE TO RELATED APPLICATIONS

The present application claims priority to and incorporates by reference the entire contents of Japanese Patent Application No. 2012-224556 filed in Japan on Oct. 9, 2012 and Japanese Patent Application No. 2013-016993 filed in Japan on Apr. 2, 2013.

BACKGROUND OF THE INVENTION

1. Field of the Invention

The present invention relates to an information processing apparatus.

2. Description of the Related Art

The user-friendliness of a device that a user directly operates is greatly affected by the time required for the device to become operable. In fact, there are many products such as smartphones and tablet computers that users can use at any moment when they want, and therefore there is a growing need for return time naturally.

For example, Japanese Patent Application Laid-open No. 2008-229989 has disclosed a technology of performing control to hold display information to be shown to a user in a storage unit at the time of transition from normal mode to shutdown mode and display the display information held in the storage unit at the time of return from the shutdown mode.

However, in the conventional technology, there is a problem that a user cannot begin any operation until after a whole apparatus including a unit with a relatively long start-up time, such as an image fixing unit, has been activated. Furthermore, the conventional technology also has a problem that a predetermined controlled unit (such as an operation device) takes a long time to go into operable state, which results in an increase in power consumption.

The present invention has been made in view of the above, and an object of the present invention is to provide an information processing apparatus capable of accelerating the activation of a predetermined controlled unit, thereby reducing power consumption.

SUMMARY OF THE INVENTION

It is an object of the present invention to at least partially solve the problems in the conventional technology.

According to the present invention, there is provided: an information processing apparatus comprising: a first processor configured to control operation of a predetermined controlled unit; a second processor configured to control operation of units of the information processing apparatus other than the predetermined controlled unit; and a power supply unit configured to supply power from a power source to the first and second processors.

In the above-mentioned information processing apparatus, the first processor and the second processor are configured to be operated in a first mode, a second mode, and a third mode, in the first mode the first processor and second processor are operable respectively, in the second mode respective amounts of power supplied to the first and second processors are lower than that in the first mode, in the third mode respective amounts of power supplied to the first and second processors are an amount between that in the first mode and that in the second mode, and at least the predetermined controlled unit is operable, and in the second mode, the first processor puts a process related to the first processor before a process related to the second processor until the second mode is transited to the third mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a diagram showing a configuration example of an image processing apparatus according to still another modification of the embodiments.

DETAILED DESCRIPTION OF THE PREFERRED EMBODIMENTS

Exemplary embodiments of an information processing apparatus according to the present invention will be explained in detail below with reference to accompanying drawings. In the following embodiments, an image processing apparatus is described as an example of the information processing apparatus; however, the present invention is not limited to this, and can be applied to any other types of information processing apparatuses, such as a personal computer, a mobile information terminal (such as a smartphone and a tablet computer), and a projector, etc.

First Embodiment

Figure 1:
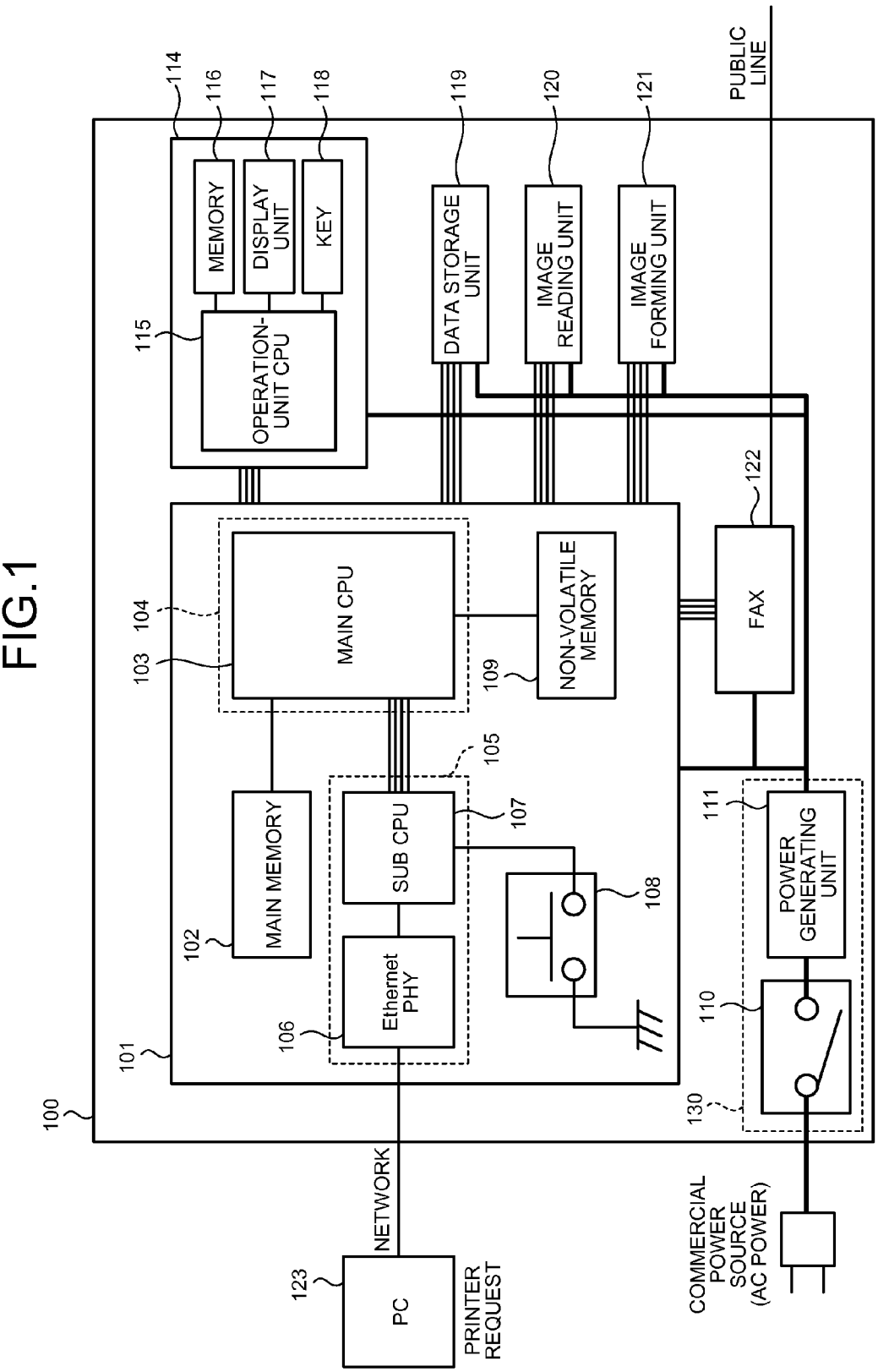
FIG. 1 is a diagram showing a configuration example of an image processing apparatus (an information processing apparatus) according to a first embodiment of the present invention.

FIG. 1 is a block diagram showing a configuration example of an image processing apparatus 100 according to a first embodiment. As shown in FIG. 1, the image processing apparatus 100 includes a controller 101, an operation panel 114, a data storage unit 119, an image reading unit 120, an image forming unit 121, a fax unit (FAX) 122, and a power supply unit (PSU) 130.

The controller 101 is a device that controls the operation of the overall image processing apparatus 100, and includes a main CPU 103, a peripheral circuit 104 of the main CPU 103, a physical layer for Ethernet (registered trademark) (hereinafter, sometimes referred to as "Ethernet PHY") 106, a sub CPU 107, a peripheral circuit 105 including the Ethernet PHY 106 and the sub CPU 107, a main memory 102, a softswitch 108, and a non-volatile memory 109.

The non-volatile memory 109 is a non-volatile memory, and stores therein programs executed by the main CPU 103 and the sub CPU 107, etc. and various data. The main memory 102 is a volatile memory, and has a working area where the main CPU 103 and the sub CPU 107 execute a program. In other words, the main memory 102 serves as a working memory of the main CPU 103 and the sub CPU 107. The main CPU 103 controls respective operations of the units of the image processing apparatus 100 other than the operation panel 114. The main CPU 103 expands a program stored in the non-volatile memory 109 onto the main memory 102, and executes the program, thereby being able to control, for example, operations of the image reading unit 120, the image forming unit 121, and the FAX 122, etc. In this example, the main CPU 103 corresponds to a "second processor" in claims, and the main memory 102 corresponds to a "second storage unit" in claims.

Furthermore, in the present embodiment, a network connection is made via the sub CPU 107. A system of connection/transmission to an external device 123, such as a PC, or the Internet depends on the form of the Ethernet PHY 106. Here, when the power to the main CPU 103 is OFF, the sub CPU 107 automatically makes a network response. Furthermore, when the state of the image processing apparatus 100 has gone into energy-saving mode (to be described later), the sub CPU 107 detects a return factor indicating a factor of return from the energy-saving mode and controls devices such as a timer. The softswitch 108 is used when the state of the image processing apparatus 100 is manually shifted to the energy-saving mode or returns from the energy-saving mode.

The image processing apparatus 100 according to the present embodiment further includes a power control unit that controls the power supply from the power supply unit (to be described later) to units of the image processing apparatus 100 (the peripheral circuit 104 including the main CPU 103, the peripheral circuit 105 including the sub CPU 107, the operation panel 114, the data storage unit 119, the image reading unit 120, the image forming unit 121, and the FAX 122, etc.). In this example, the power control unit is realized by the sub CPU 107; however, it is not limited to this. In this example, the sub CPU 107 can be considered to correspond to a "sub control unit (including a function of a power control unit)" in claims.

The operation panel 114 is a device that accepts operation input. In the present embodiment, the operation panel 114 includes an operation-unit CPU 115, a memory 116, a display unit 117, and a key 118. The display unit 117 is a device for displaying thereon a variety of information depending on the state of the image processing apparatus 100, and can be composed of, for example, a liquid crystal panel or the like. The key 118 is a device for a user to perform various input operations. The memory 116 is a volatile memory, and has a working area where the operation-unit CPU 115 executes a program. In other words, the memory 116 serves as a working memory of the operation-unit CPU 115.

The operation-unit CPU 115 controls the operation of the overall operation panel 114. The operation-unit CPU 115 expands a predetermined program onto the memory 116, and executes the program, thereby being able to control the operation of the operation panel 114. In this example, the operation-unit CPU 115 corresponds to a "first processor" in claims, and the memory 116 corresponds to a "first storage unit" in claims. Furthermore, in this example, the operation panel 114 corresponds to a "predetermined controlled unit" in claims; however, the "predetermined controlled unit" in claims is not limited to this.

The data storage unit 119 has a function of storing therein various data. The image reading unit 120 has a function of reading image data. The image forming unit 121 has a function of forming an image on a recording medium, such as a sheet of paper. The FAX 122 has a function of transmitting and receiving image data via a public network.

The power supply unit 130 supplies and shuts off power from a power source to the units of the image processing apparatus 100 (the peripheral circuit 104 including the main CPU 103, the peripheral circuit 105 including the sub CPU 107, the operation panel 114, the data storage unit 119, the image reading unit 120, the image forming unit 121, and the FAX 122, etc.) under the control of the main CPU 103 or the sub CPU 107. The power supply unit 130 includes a main power switch 110 and a power generating unit 111. When the main power switch 110 has been turned ON, the power generating unit 111 is connected to a commercial power source, and converts alternating-current (AC) power supplied from the commercial power source into direct-current (DC) power that can drive the units of the image processing apparatus 100.

Figure 2:
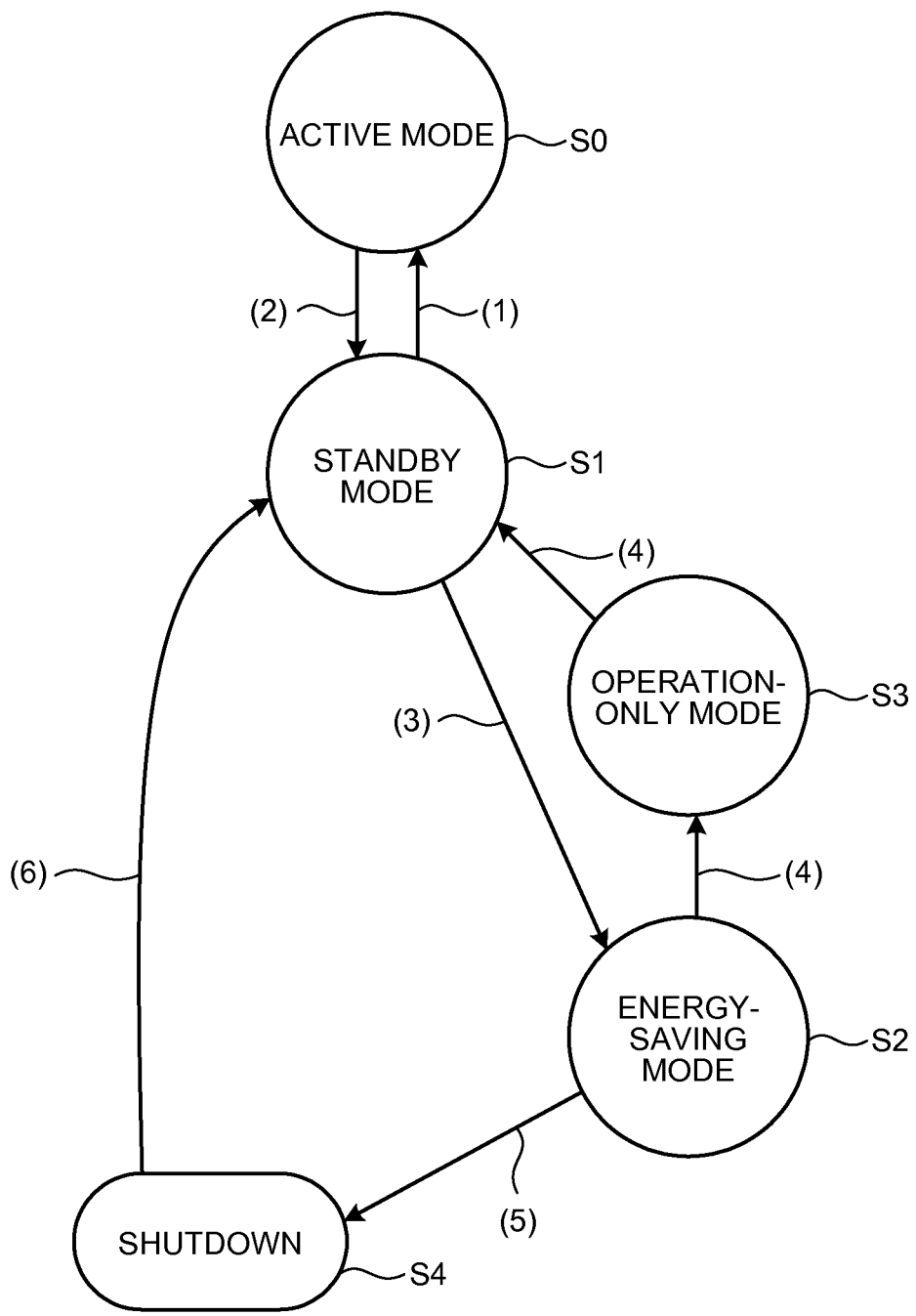
FIG. 2 is a diagram for explaining state transition of the image processing apparatus.

FIG. 2 is a schematic diagram for explaining the state (mode) transition of the image processing apparatus 100. As shown in FIG. 2, the image processing apparatus 100 has five modes: active mode S0, standby mode S1, energy-saving mode S2, operation-only mode S3, and shutdown mode S4.

The active mode S0 means a state where the image processing apparatus 100 is performing a copy function or a printer function, etc. (for example, a state where the image reading unit 120 is performing a reading operation, a state where the image forming unit 121 is performing an image forming operation, or a state where the FAX 122 is performing a faxing operation, etc.); power consumption of the image processing apparatus 100 is highest in the active mode S0. The standby mode S1 means a state where the units of the image processing apparatus 100 are on standby while they are being in operable state. In this example, the standby mode S1 corresponds to a "first mode" in claims.

The energy-saving mode S2 means a state where power consumption of the image processing apparatus 100 being in a power-on state is lowest. In this state, an amount of power supplied to the data storage unit 119, the image reading unit 120, and the image forming unit 121 is controlled to be a lower value (for example, may be zero) than that in the standby mode S1. Furthermore, respective amounts of power supplied to the main CPU 103 and the operation-unit CPU 115 are each controlled to be a lower value (for example, may be zero) than that in the standby mode S1. In the energy-saving mode S2, the sub CPU 107 makes a network response and detects a return factor. In the present embodiment, when a return factor has been detected while the image processing apparatus 100 is in the energy-saving mode S2, the state of the image processing apparatus 100 returns back to the standby mode S1 through the operation-only mode S3 to be described below. In this example, the energy-saving mode S2 corresponds to a "second mode" in claims.

The operation-only mode S3 means a state where the image processing apparatus 100 is during the return from the energy-saving mode S2 to the standby mode S1, and means a state where respective amounts of power supplied to the main CPU 103 and the operation-unit CPU 115 are an amount between that in the first mode and that in the second mode and at least the operation panel 114 is in operable state. In the present embodiment, in the operation-only mode S3, functions of the main body, such as the image reading unit 120 and the image forming unit 121, cannot be used; however, the operation panel 114 becomes in the operable state, so that a user can operate the operation panel 114. In the operation-only mode S3, a function of the main body is running in the background, and after the transition to the operation-only mode S3, a synchronization process for synchronizing the main CPU 103 and the operation-unit CPU 115 is performed. In this example, the operation-only mode S3 corresponds to a "third mode" in claims.

The shutdown mode S4 means a state where the main power switch 110 has been turned OFF and the power supply to the image processing apparatus 100 has been shut off.

Subsequently, conditions of transitions between modes are explained. A condition (1) of transition from the active mode S0 to the standby mode S1 includes, for example, the end of a print job. Furthermore, a condition (2) of transition from the standby mode S1 to the active mode S0 includes, for example, the start of a print job.

Moreover, a condition (3) of transition from the standby mode S1 to the energy-saving mode S2 includes, for example, detection of user operation made on the softswitch 108, acceptance of input of selection (designation) of the energy-saving mode S2 made by user operation on the operation panel 114, and receipt of information indicating that it is time to make the transition to the energy-saving mode S2 from the timer (not shown). When the condition (3) of transition from the standby mode S1 to the energy-saving mode S2 is met, the sub CPU 107 (the power control unit) controls an amount of power supplied to the units of the image processing apparatus 100 to be a lower value than that in the standby mode S1.

Furthermore, a condition (4) of transition from the energy-saving mode S2 to the standby mode S1 (the operation-only mode S3) includes, for example, detection of user operation made on the softswitch 108, acceptance of input of selection (designation) of the standby mode S1 made by user operation on the operation panel 114, and receipt of information indicating that it is time to make the transition to the standby mode S1 from the timer (not shown). When the condition (4) of transition from the energy-saving mode S2 to the standby mode S1 is met, the sub CPU 107 (the power control unit) controls power supplied to the units of the image processing apparatus 100 so that the units of the image processing apparatus 100 go into operable state.

Moreover, a condition (5) of transition from the energy-saving mode S2 to the shutdown mode S4 includes, for example, the main power switch 110 having been switched off by user operation. When the condition (5) of transition from the energy-saving mode S2 to the shutdown mode S4 is met (when the main power switch 110 has been turned off), the power supply to the units of the image processing apparatus 100 is shut off.

Furthermore, a condition (6) of transition from the shutdown mode S4 to the standby mode S1 includes, for example, the main power switch 110 having been switched on by user operation. When the condition (6) of transition from the shutdown mode S4 to the standby mode S1 is met (when the main power switch 110 has been turned on), the sub CPU 107 controls power supplied to the units of the image processing apparatus 100 so that the units of the image processing apparatus 100 go into operable state.

Figure 3:
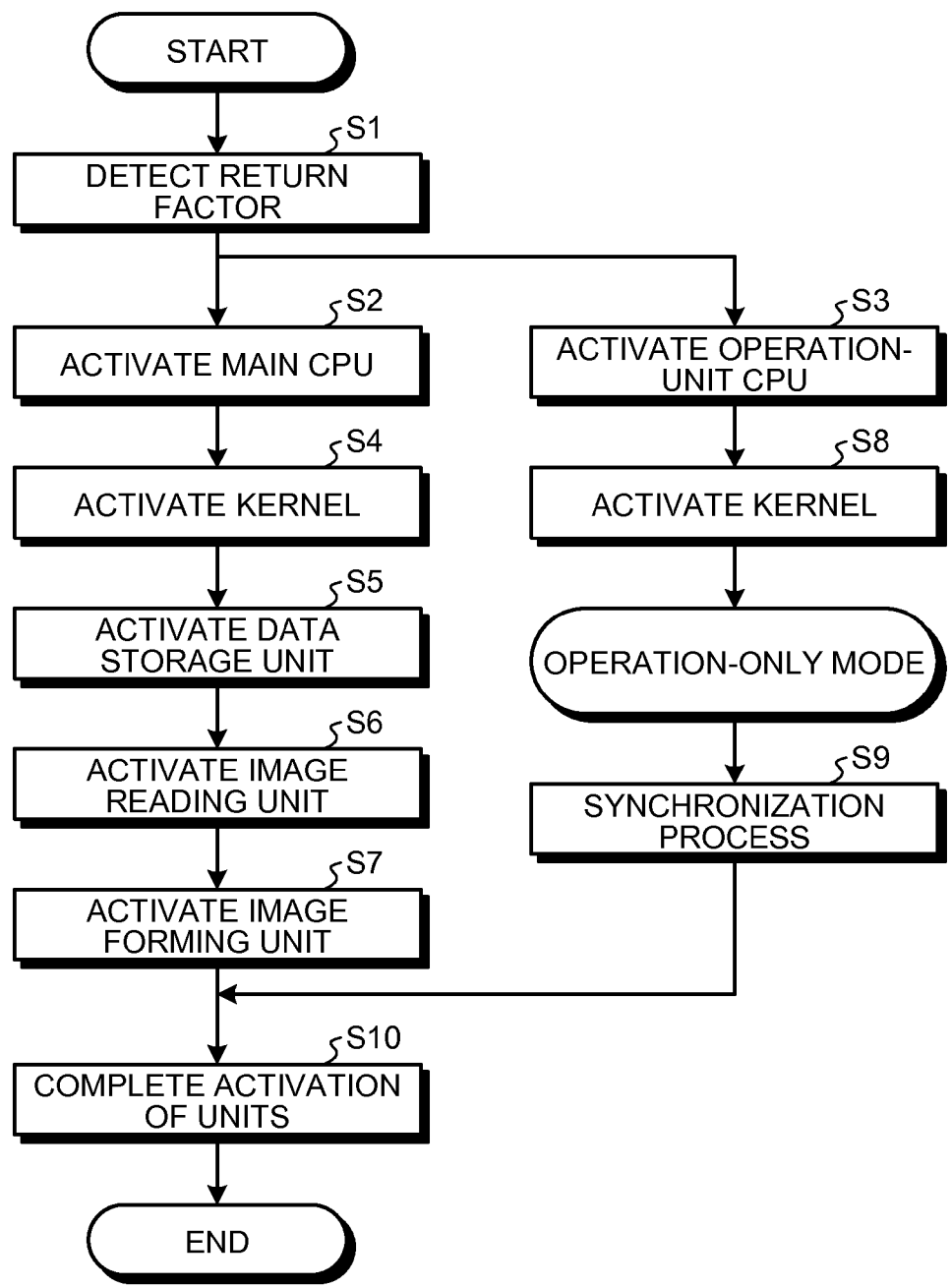
FIG. 3 is a flowchart showing an operation example of the image processing apparatus.

Subsequently, an operation example of the image processing apparatus 100 when returning from the energy-saving mode S2 to the standby mode S1 is explained with reference to FIG. 3. FIG. 3 is a flowchart showing the operation example of the image processing apparatus 100 when returning from the energy-saving mode S2 to the standby mode S1. In the present embodiment, in the energy-saving mode S2, the operation-unit CPU 115 puts a process related to the operation-unit CPU 115 before a process related to the main CPU 103 until transition to the operation-only mode S3. More specifically, in the energy-saving mode S2, the operation-unit CPU 115 performs a return process for returning the operation panel 114 to operable state without performing a synchronization process for establishing synchronization with the main CPU 103 until the image processing apparatus 100 has made the transition to the operation-only mode S3. This process is concretely explained below.

First, the sub CPU 107 detects a return factor (Step S1). When having detected a return factor, the sub CPU 107 controls power supplied to the main CPU 103 and the operation-unit CPU 115 so that the main CPU 103 and the operation-unit CPU 115 go into operable state. This activates the main CPU 103 (Step S2), and also activates the operation-unit CPU 115 (Step S3).

After the Step S2, the activated main CPU 103 initiates a return process for returning units of the image processing apparatus 100 other than the operation panel 114 to operable state. More specifically, the main CPU 103 sequentially performs a kernel activating process (Step S4), a process of activating the data storage unit 119 (Step S5), a process of activating the image reading unit 120 (Step S6), and a process of activating the image forming unit 121 (Step S7);

however, here, the main CPU 103 does not perform a synchronization process for establishing synchronization with the operation-unit CPU 115 until the state of the image processing apparatus 100 has made the transition from the energy-saving mode S2 to the operation-only mode S3 during the return to the standby mode S1.

On the other hand, after the Step S3, the activated operation-unit CPU 115 initiates a return process for returning the operation panel 114 to operable state. More specifically, the operation-unit CPU 115 performs a kernel activating process (Step S8), and does not perform a synchronization process for establishing synchronization with the main CPU 103 until the state of the image processing apparatus 100 has made the transition to the operation-only mode S3 in which only the operation panel 114 is in operable state. Then, after the transition to the operation-only mode S3, the operation-unit CPU 115 performs the synchronization process (Step S9), and when all preparations required to provide a function of the apparatus have been made, the transition to the standby mode S1 is completed. That is, when the units of the image processing apparatus 100 have been activated (Step S10), the transition to the standby mode S1 is completed.

Figure 4:
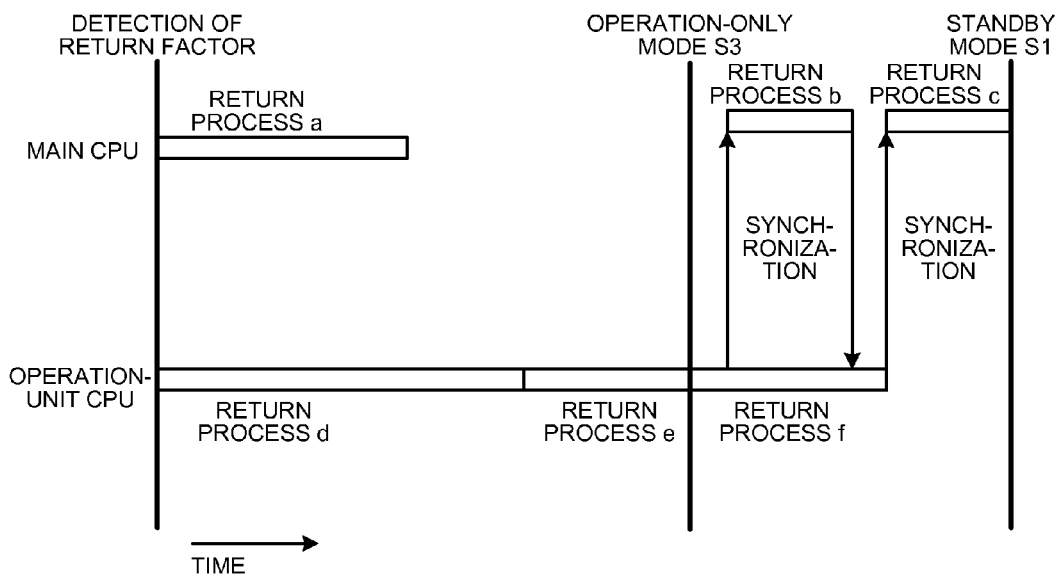
FIG. 4 is a time-sequence diagram of return processes performed by a main CPU and operation-unit CPU according to the first embodiment when the state of the image processing apparatus returns from energy-saving mode to standby mode.

FIG. 4 is a time-sequence diagram of return processes performed by the main CPU 103 and the operation-unit CPU 115 when the state of the image processing apparatus 100 returns from the energy-saving mode S2 to the standby mode S1. When a return factor has been detected by the sub CPU 107, and the main CPU 103 and the operation-unit CPU 115 have been activated, the main CPU 103 initiates a return process a, and the operation-unit CPU 115 initiates a return process d. The return process a performed by the main CPU 103 includes, for example, a reset canceling process, a kernel activating process, and an application-software activating process. Furthermore, the return process d performed by the operation-unit CPU 115 includes, for example, a reset canceling process and a kernel activating process.

After completion of the return process d, the operation-unit CPU 115 continuously initiates a return process e without performing a synchronization process for establishing synchronization with the main CPU 103. The return process e performed by the operation-unit CPU 115 includes, for example, a process of activating operation-unit software (software for the operation panel 114) and a process of informing (displaying a message) that preparations for operation on the operation panel 114 have been made. Then, after the transition to the operation-only mode S3, the operation-unit CPU 115 and the main CPU 103 sequentially perform return processes while establishing synchronization with each other. In an example shown in FIG. 4, the operation-unit CPU 115 performs a return process f, and the main CPU 103 performs a return process b and a return process c sequentially. The return process f performed by the operation-unit CPU 115 includes a process requiring synchronization with the main CPU 103, a process of reflecting device information, and a process of updating the time display, etc. Furthermore, the return process b performed by the main CPU 103 includes a process of activating operation-unit response software, etc. Moreover, the return process c performed by the main CPU 103 includes a process of informing that communication with the operation panel 114 has been completed and a process of informing that preparations for use of a device have been made, etc.

Figure 5:
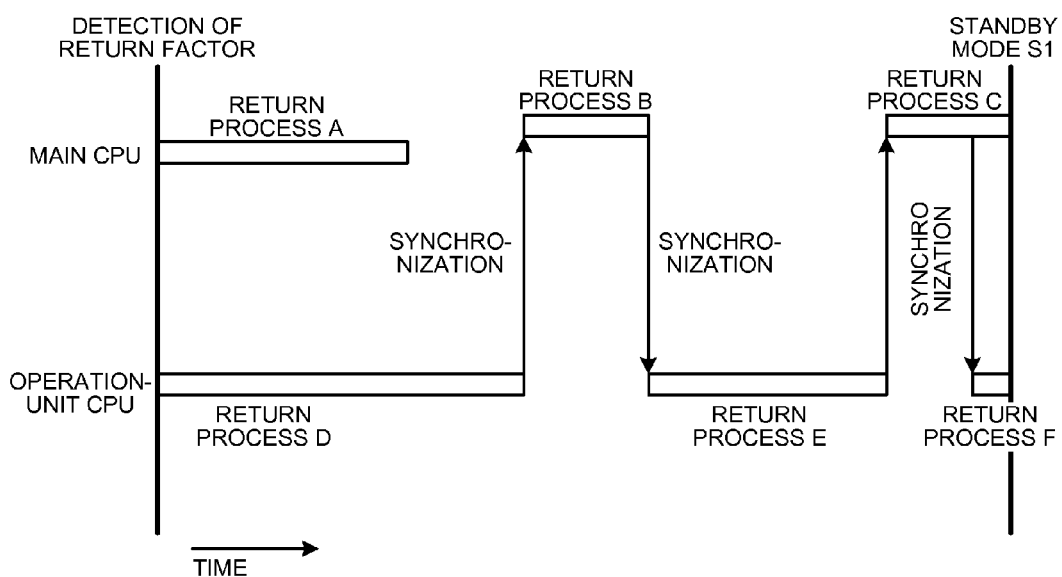
FIG. 5 is a time-sequence diagram of return processes performed by the main CPU and operation-unit CPU according to a comparative example when the state of the image processing apparatus returns from the energy-saving mode to the standby mode.

Here, as a comparative example, let us assume that the image processing apparatus 100 has a conventional configuration in which the operation-only mode S3 is not provided. In other words, as a comparative example, let us assume that when the state of the image processing apparatus 100 returns from the energy-saving mode S2 to the standby mode S1, the main CPU 103 and the operation-unit CPU 115 sequentially perform return processes while establishing synchronization with each other. FIG. 5 is a time-sequence diagram of the return processes performed by the main CPU 103 and the operation-unit CPU 115 when the state of the image processing apparatus 100 returns from the energy-saving mode S2 to the standby mode S1 in the comparative example.

As shown in FIG. 5, after the main CPU 103 and the operation-unit CPU 115 have been activated upon detection of a return factor by the sub CPU 107, the main CPU 103 initiates a return process A, and the operation-unit CPU 115 initiates a return process D. The return process A performed by the main CPU 103 includes, for example, a reset canceling process, a kernel activating process, and an application-software activating process. Furthermore, the return process D performed by the operation-unit CPU 115 includes, for example, a reset canceling process and a kernel activating process.

In the example shown in FIG. 5, upon completion of the return process D performed by the operation-unit CPU 115, the main CPU 103 establishes synchronization (performs a synchronization process for establishing synchronization with the operation-unit CPU 115), and, after the establishment of synchronization, initiates a return process B. The return process B performed by the main CPU 103 includes a process of activating operation-unit response software, etc. Upon completion of the return process B performed by the main CPU 103, the operation-unit CPU 115 establishes synchronization (performs a synchronization process for establishing synchronization with the main CPU 103), and, after the establishment of synchronization, initiates a return process E. The return process E performed by the operation-unit CPU 115 includes, for example, a process of activating operation-unit software (software for the operation panel 114), a process of reflecting device information, and a process of updating the time display, etc. Likewise, while establishing synchronization with each other, the main CPU 103 performs a return process C, and the operation-unit CPU 115 performs a return process F. The return process C performed by the main CPU 103 includes a process of informing that communication with the operation panel 114 has been completed and a process of informing that preparations for use of a device have been made, etc. Furthermore, the return process F performed by the operation-unit CPU 115 includes a process of informing (displaying a message) that preparations for operation on the operation panel 114 have been made, etc.

In the example shown in FIG. 5, there is a problem that the operation panel 114 does not go into operable state (an operational state) until the activation of the units of the image processing apparatus 100 has been completed. On the other hand, in the present embodiment, the operation-only mode S3 in which only the operation panel 114 is operable is provided as a state during the transition from the energy-saving mode S2 to the standby mode S1, and in the energy-saving mode S2, the operation-unit CPU 115 performs a return process for returning the operation panel 114 to operable state without performing a synchronization process for establishing synchronization with the main CPU 103 until the image processing apparatus 100 has made the transition to the operation-only mode S3, and therefore the time required for the operation panel 114 to go into operable state can be reduced as compared with the comparative example. Therefore, according to the present embodiment, it is possible to accelerate the activation of the operation panel 114 and reduce unnecessary power consumption related to the activation of the engine side, such as the image forming unit 121.

Second Embodiment

Figure 6:
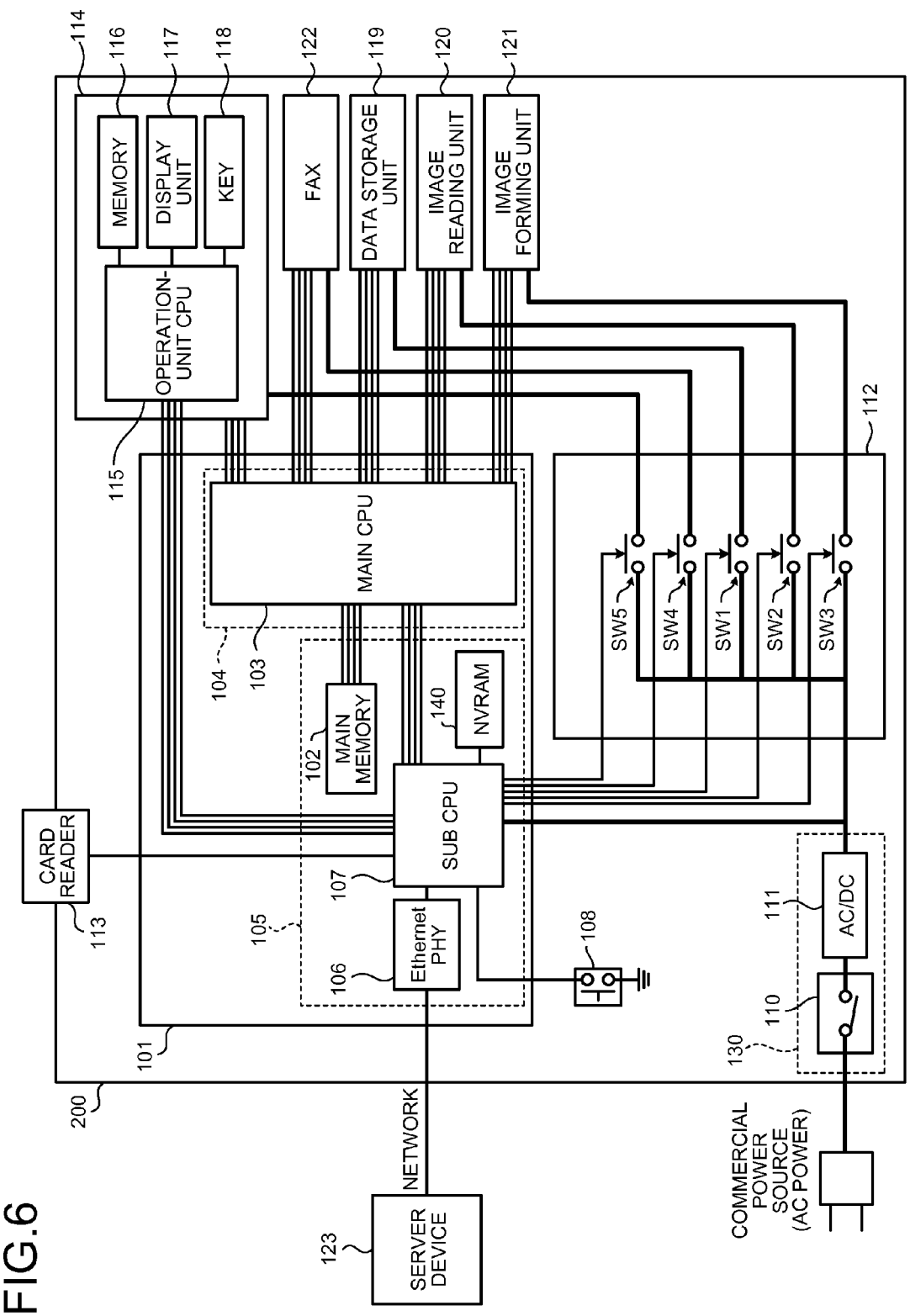
FIG. 6 is a block diagram showing a configuration example of an image processing apparatus 200 according to a second embodiment of the present invention.

Subsequently, a second embodiment is explained. FIG. 6 is a block diagram showing a configuration example of an image processing apparatus 200 according to a second embodiment. The image processing apparatus 200 differs from the image processing apparatus 100 according to the first embodiment in that the image processing apparatus 200 further has a user authentication function. In addition, description of a part in common with the first embodiment is arbitrarily omitted.

As shown in FIG. 6, the image processing apparatus 200 further includes a card reader (an example of an authentication device) 113 used in authentication of a user. When a user inserts an IC card into the card reader 113, the card reader 113 reads identification information (user information) written to the IC card. Then, the card reader 113 transmits the read identification information to the sub CPU 107. The sub CPU 107 gets access to a server device 123 connected to the image processing apparatus 200 via a network, and determines (verifies) whether the identification information read by the card reader 113 exists within multiple pieces of identification information previously registered in the server device 123, thereby authenticating the user. When the identification information read by the card reader 113 exists within the multiple pieces of identification information previously registered in the server device 123, the user is authenticated (it is determined that the user has authority to use the image processing apparatus 200). On the other hand, when the identification information read by the card reader 113 does not exist within the multiple pieces of identification information previously registered in the server device 123, the user is not authenticated (it is determined that the user has no authority to use the image processing apparatus 200). In addition, the card reader 113 is not limited to a contact type, and can be a non-contact type.

As shown in FIG. 6, the image processing apparatus 200 further includes a centralized power switch 112 that controls the passage of electric current to units other than the controller 101. The centralized power switch 112 is composed of five switches (SW1 to SW5). The switch SW1 is placed between an output-side line (wiring) of the power supply unit 130 and the data storage unit 119, and switches connection/non-connection between the power supply unit 130 and the data storage unit 119. The switch SW2 is placed between the output-side line (wiring) of the power supply unit 130 and the image reading unit 120, and switches connection/non-connection between the power supply unit 130 and the image reading unit 120. The switch SW3 is placed between the output-side line (wiring) of the power supply unit 130 and the image forming unit 121, and switches connection/non-connection between the power supply unit 130 and the image forming unit 121. The switch SW4 is placed between the output-side line (wiring) of the power supply unit 130 and the FAX 122, and switches connection/non-connection between the power supply unit 130 and the FAX 122. The switch SW5 is placed between the output-side line (wiring) of the power supply unit 130 and the operation panel 114, and switches connection/non-connection between the power supply unit 130 and the operation panel 114. In the present embodiment, the sub CPU 107 controls on/off of the switches (SW1 to SW5) included in the centralized power switch 112 individually.

In the example shown in FIG. 6, instead of the non-volatile memory 109, an NVRAM (an example of a non-volatile memory) 140 is connected to the sub CPU 107.

Furthermore, in the present embodiment, the sub CPU 107 has a function of detecting an authentication request for authentication of a user and detection of an authentication request by the sub CPU 107 is one of return factors of return from the energy-saving mode S2 to the standby mode S1.

When the sub CPU 107 has detected an authentication request as a factor of return from the energy-saving mode S2 to the standby mode S1, the sub CPU 107 controls power supplied to the operation-unit CPU 115 and the main CPU 103 so that the operation-unit CPU 115 and the main CPU 103 go into operable state, and also performs authentication of a user. Furthermore, when the sub CPU 107 has detected a factor other than an authentication request as a factor of return from the energy-saving mode S2 to the standby mode S1, the sub CPU 107 controls power supplied to the operation-unit CPU 115 so that only the operation-unit CPU 115 out of the operation-unit CPU 115 and the main CPU 103 goes into operable state. Then, when the operation panel 114 has gone into operable state, the operation-unit CPU 115 controls the operation panel 114 to display a message prompting the authentication of a user.

Figure 7:
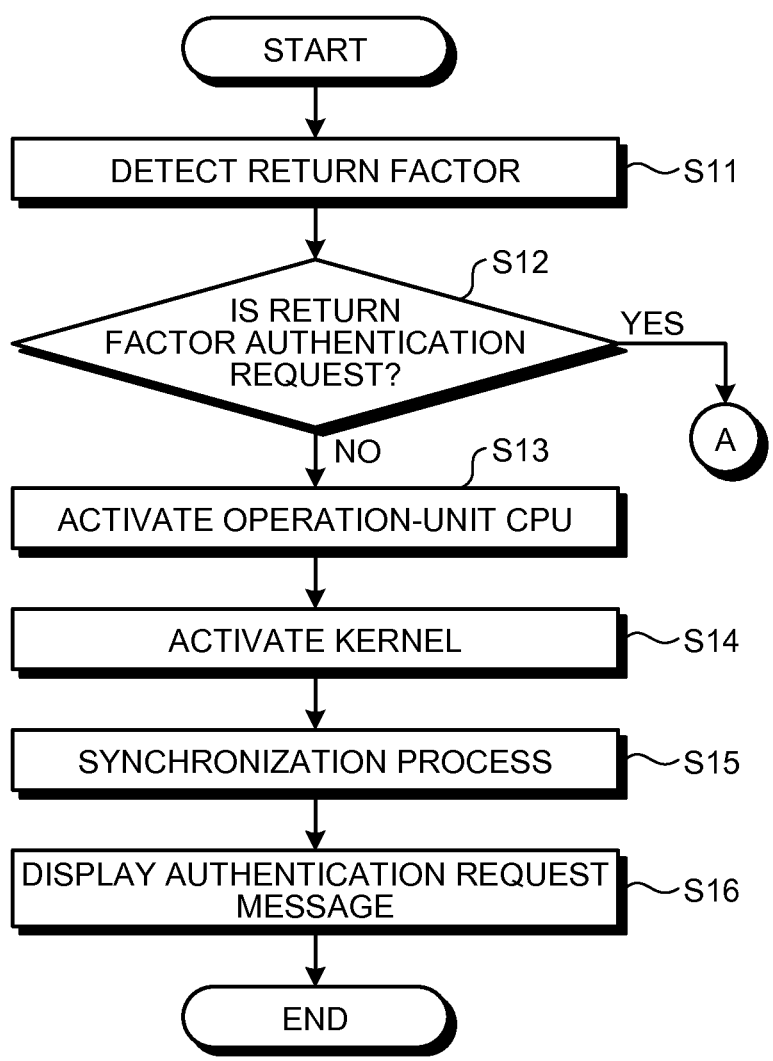
FIG. 7 is a flowchart showing an operation example of the image processing apparatus when returning from the energy-saving mode to the standby mode.
Figure 8:
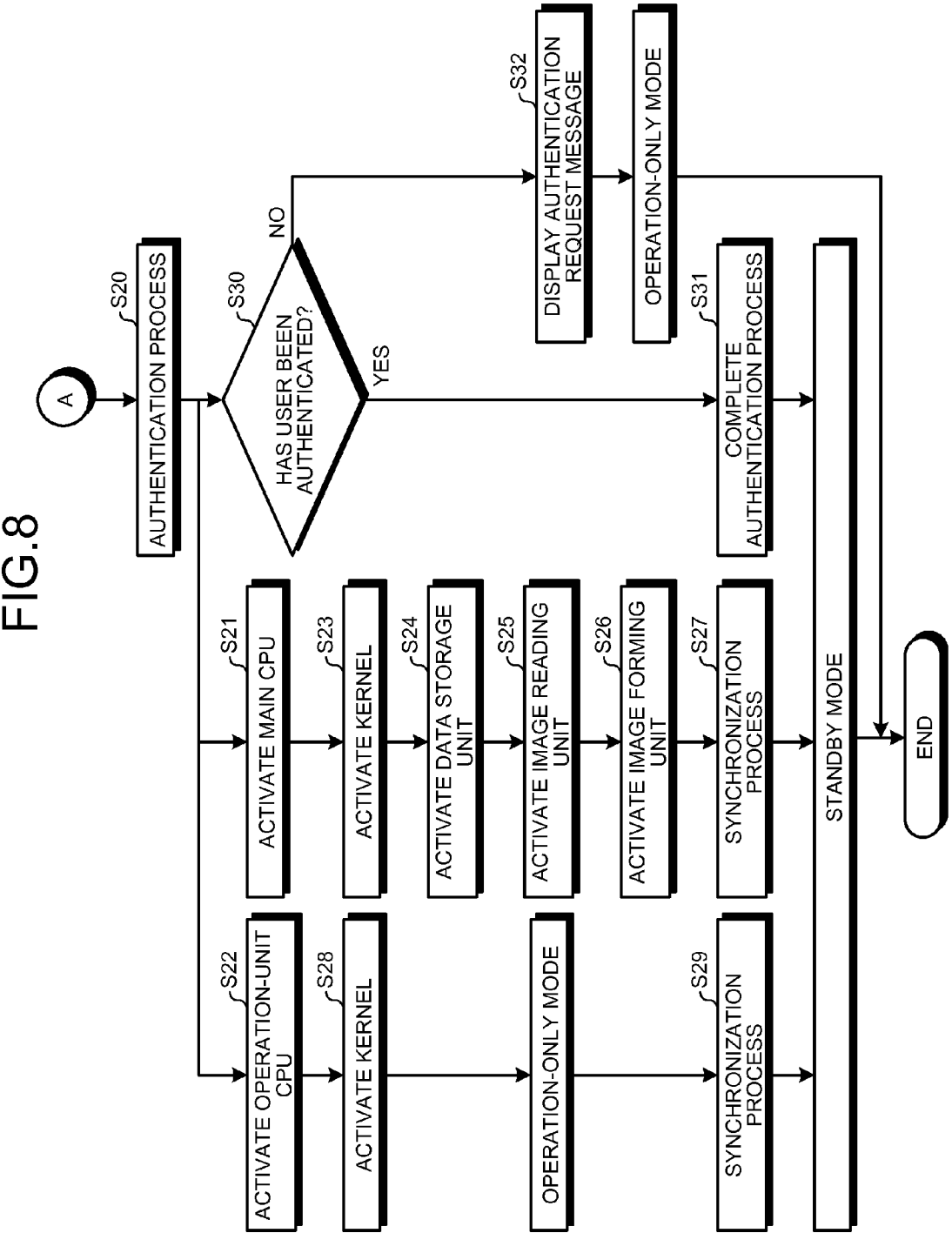
FIG. 8 is a flowchart showing an operation example of the image processing apparatus when returning from the energy-saving mode to the standby mode.

Subsequently, an operation example of the image processing apparatus 200 when returning from the energy-saving mode S2 to the standby mode S1 is explained with reference to FIGS. 7 and 8. FIGS. 7 and 8 are flowcharts showing the operation example of the image processing apparatus 200 when returning from the energy-saving mode S2 to the standby mode S1.

As shown in FIG. 7, first, the sub CPU 107 detects a return factor (Step S11). When the detected return factor is an authentication request (YES at Step S12), the process moves on to the flow shown in FIG. 8. The flow shown in FIG. 8 will be described later. When the detected return factor is a factor other than an authentication request (NO at Step S12), the sub CPU 107 controls power supplied to the operation-unit CPU 115 so that the operation-unit CPU 115 goes into operable state. This activates the operation-unit CPU 115 (Step S13).

After the Step S13, the activated operation-unit CPU 115 initiates a return process for returning the operation panel 114 to operable state. More specifically, the operation-unit CPU 115 performs a kernel activating process (Step S14), and does not perform a synchronization process for establishing synchronization with the main CPU 103 until the state of the image processing apparatus 200 has made the transition to the operation-only mode S3. Then, after the transition to the operation-only mode S3, the operation-unit CPU 115 performs the synchronization process (Step S15). Then, the operation-unit CPU 115 performs control for displaying information prompting the authentication of a user (an authentication request message) on the display unit 117 (Step S16).

Subsequently, the flow shown in FIG. 8 is explained. When the detected return factor is an authentication request (YES at Step S12 shown in FIG. 7), as shown in FIG. 8, the sub CPU 107 performs authentication process (Step S20), and also controls power supplied to the main CPU 103 and the operation-unit CPU 115 so that the main CPU 103 and the operation-unit CPU 115 go into operable state. This activates the main CPU 103 (Step S21), and also activates the operation-unit CPU 115 (Step S22).

After the Step S21, the activated main CPU 103 initiates a return process for returning units of the image processing apparatus 200 other than the operation panel 114 to operable state. More specifically, the main CPU 103 sequentially performs a kernel activating process (Step S23), a process of activating the data storage unit 119 (Step S24), a process of activating the image reading unit 120 (Step S25), and a process of activating the image forming unit 121 (Step S26). Then, after the transition to the operation-only mode S3, the main CPU 103 performs a synchronization process (Step S27).

On the other hand, after the Step S22, the activated operation-unit CPU 115 initiates a return process for returning the operation panel 114 to operable state. More specifically, the operation-unit CPU 115 performs a kernel activating process (Step S28), and does not perform a synchronization process for establishing synchronization with the main CPU 103 until the state of the image processing apparatus 200 has made the transition to the operation-only mode S3 in which only the operation panel 114 is in operable state. Then, after the transition to the operation-only mode S3, the operation-unit CPU 115 performs the synchronization process (Step S29).

Furthermore, when a user has been authenticated in the authentication process (YES at Step S30), the authentication process is completed (Step S31). On the other hand, when a user has not been authenticated in the authentication process (NO at Step S30), the operation-unit CPU 115 performs control for displaying information prompting the authentication of the user (an authentication request message) on the display unit 117 (Step S32). Then, the process is terminated in the state of the operation-only mode S3 (a state where the user still cannot use a function of the apparatus (the user has not been authenticated), but can operate the operation panel 114).

In the above-described flow, the transition to the standby mode S1 is completed when all preparations required to provide the function of the apparatus have been made and the authentication process has been completed.

Figure 9:
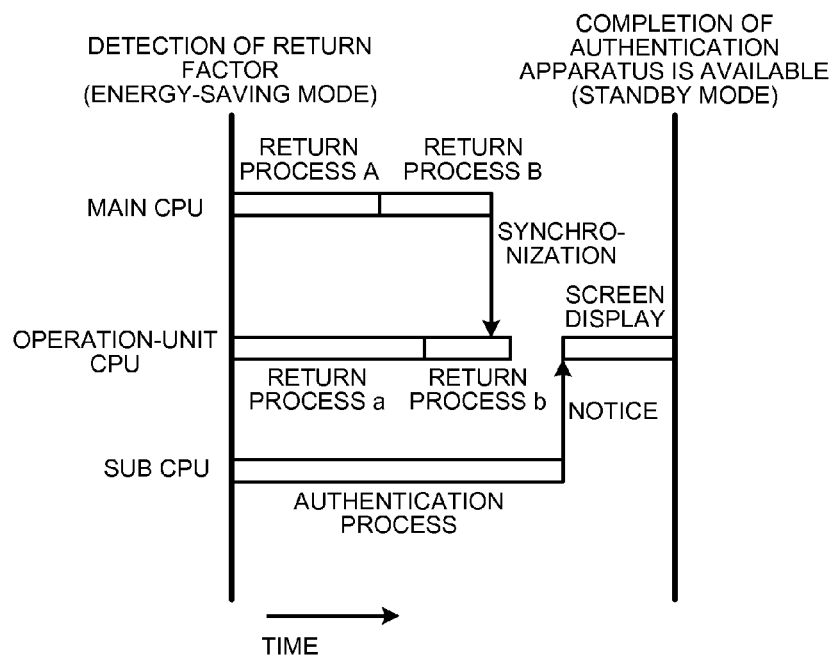
FIG. 9 is a time-sequence diagram of processes performed by the main CPU, the operation-unit CPU, and a sub CPU when the state of the image processing apparatus returns from the energy-saving mode to the standby mode.

FIG. 9 is a time-sequence diagram of return processes performed by the main CPU 103, the operation-unit CPU 115, and the sub CPU 107 when the state of the image processing apparatus 200 returns from the energy-saving mode S2 to the standby mode S1. When having detected an authentication request which is a return factor, the sub CPU 107 initiates an authentication process, and also activates the main CPU 103 and the operation-unit CPU 115. After the main CPU 103 and the operation-unit CPU 115 have been activated, the main CPU 103 initiates a return process A, and the operation-unit CPU 115 initiates a return process a.

Upon completion of the return process A, the main CPU 103 continuously performs a return process B without performing a synchronization process for establishing synchronization with the operation-unit CPU 115. Furthermore, upon completion of the return process a, the operation-unit CPU 115 continuously performs a return process b without performing a synchronization process for establishing synchronization with the main CPU 103. Then, after the transition to the operation-only mode S3, the operation-unit CPU 115 and the main CPU 103 perform the synchronization process with each other. Moreover, upon completion of the authentication process, the sub CPU 107 informs the main CPU 103 and the operation-unit CPU 115 that a user has been authenticated, and the image processing apparatus 200 becomes available. In this example, the operation-unit CPU 115 performs control for displaying information that the user authentication has been completed and the image processing apparatus 200 is available on the display unit 117.

Figure 10:
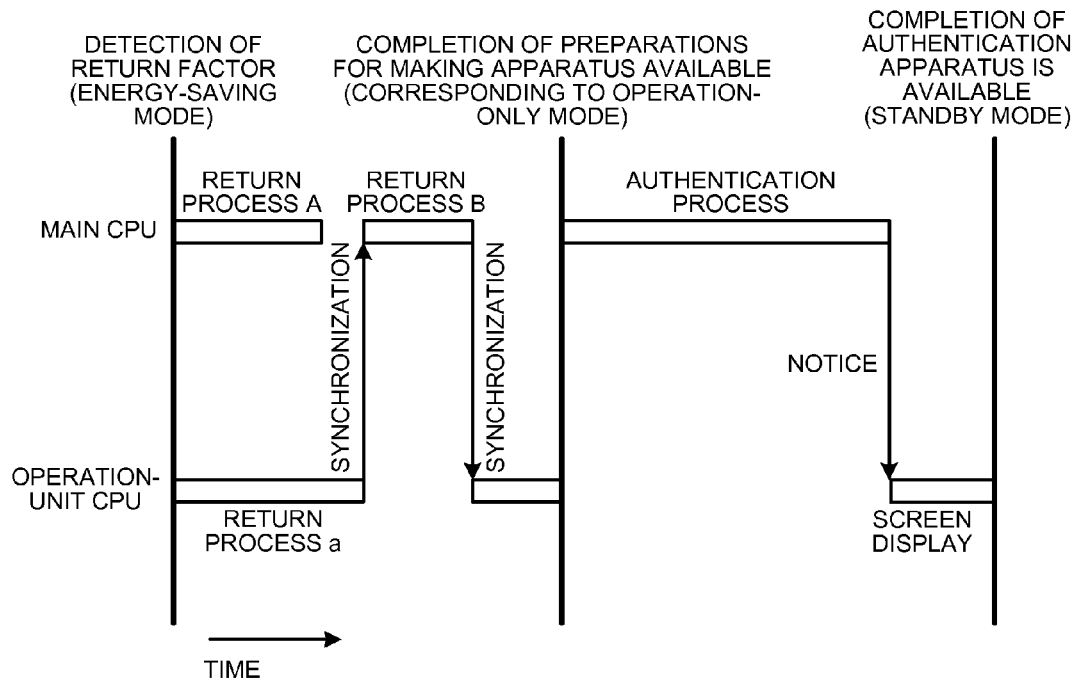
FIG. 10 is a time-sequence diagram of processes performed by the main CPU and the operation-unit CPU when the state of the image processing apparatus returns from the energy-saving mode to the standby mode in a comparative example.

Here, as a comparative example, let us assume that when the state of the image processing apparatus 200 returns from the energy-saving mode S2 to the standby mode S1, the main CPU 103 and the operation-unit CPU 115 perform return processes while establishing synchronization with each other, and, after all preparations required to provide a function of the apparatus have been made, perform an authentication process. FIG. 10 is a time-sequence diagram of the processes performed by the main CPU 103 and the operation-unit CPU 115 when the state of the image processing apparatus 200 returns from the energy-saving mode S2 to the standby mode S1 in the comparative example. In the comparative example, the main CPU 103 performs the authentication process.

As shown in FIG. 10, after the main CPU 103 and the operation-unit CPU 115 have been activated upon detection of an authentication request which is a return factor, the main CPU 103 initiates a return process A, and the operation-unit CPU 115 initiates a return process a. In this example, upon completion of the return process a performed by the operation-unit CPU 115, the main CPU 103 establishes synchronization (performs a synchronization process for establishing synchronization with the operation-unit CPU 115), and, after the establishment of synchronization, initiates a return process B. Upon completion of the return process B performed by the main CPU 103, the operation-unit CPU 115 establishes synchronization (performs a synchronization process for establishing synchronization with the main CPU 103), and, after the establishment of synchronization, initiates a return process b. Then, when the return processes performed by the main CPU 103 and the operation-unit CPU 115 have been completed, the image processing apparatus 200 is in a state where all preparations required to provide a function have been made. This state can be considered to correspond to the operation-only mode S3. Then, the authentication process is initiated, and, after completion of the authentication, the image processing apparatus 200 becomes available.

In the above-described comparative example, when the state of the image processing apparatus 200 returns from the energy-saving mode S2 to the standby mode S1, the main CPU 103 and the operation-unit CPU 115 perform the return processes while establishing synchronization with each other, and, after all preparations required to provide a function of the apparatus have been made, perform the authentication process; therefore, there is a problem that it takes a long time to make the apparatus available. On the other hand, in the present embodiment, when the state of the image processing apparatus 200 returns from the energy-saving mode S2 to the standby mode S1, until the image processing apparatus 200 has made the transition to the operation-only mode S3, the main CPU 103 and the operation-unit CPU 115 preferentially perform return processes without performing the synchronization process for establishing synchronization with each other, and the sub CPU 107 performs the authentication process in parallel with the return processes; therefore, the time required to make the apparatus available can be reduced as compared with the comparative example. Therefore, according to the present embodiment, it is possible to improve the user-friendliness.

Variation 1 of Second Embodiment

The sub CPU 107 can cause the operation-unit CPU 115 to display a warning on the display unit 117 if an authentication device (for example, the card reader 113) used in authentication of a user was connected in the past but is not currently connected to the image processing apparatus 200. The details are as follows. In addition, in this example, connection information (for example, a flag) indicating whether an authentication device was connected to the image processing apparatus 200 has been stored in the NVRAM 140.

Figure 11:
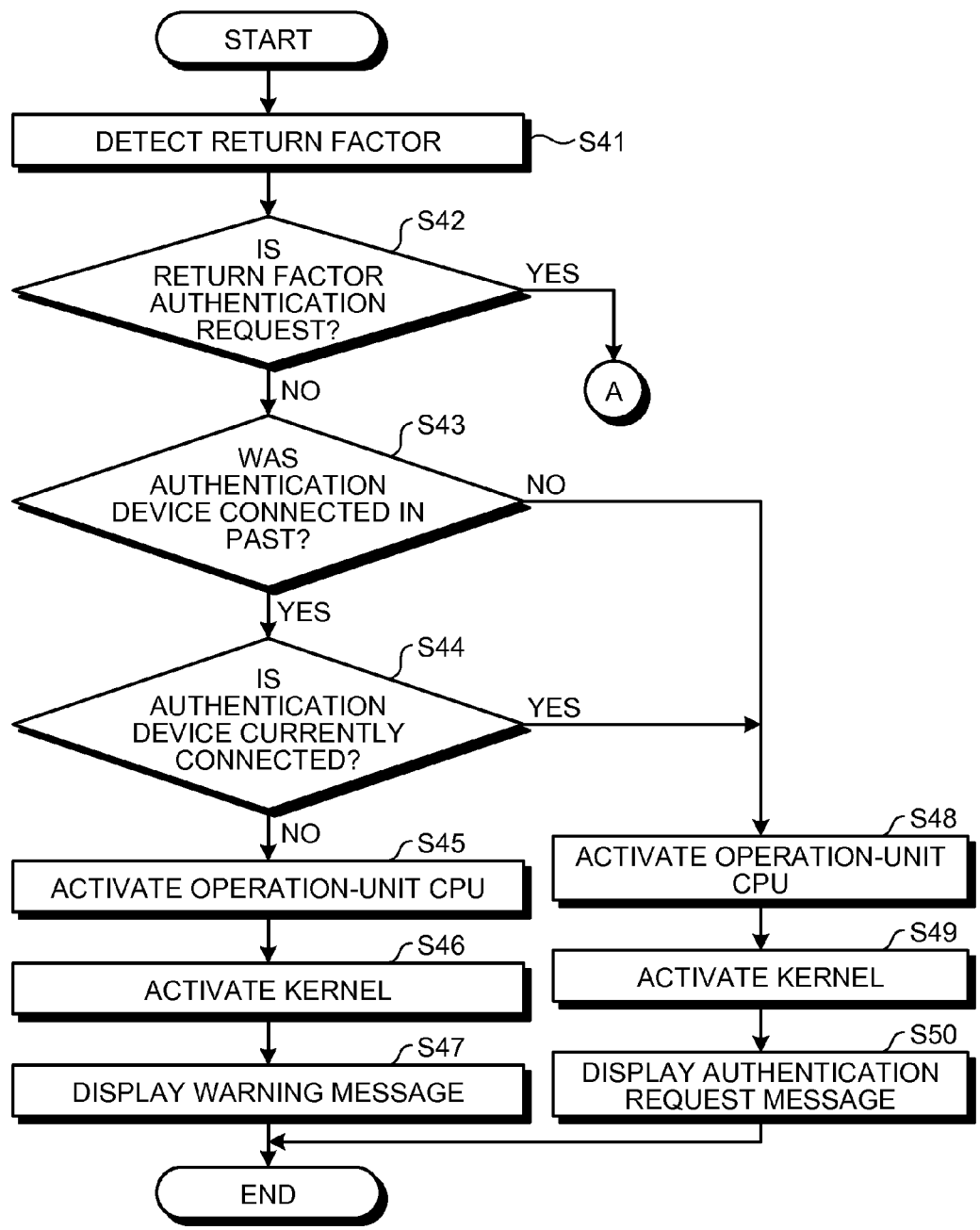
FIG. 11 is a flowchart for explaining an operation example of the image processing apparatus 200 when returning from the energy-saving mode to the standby mode.

Subsequently, an operation example of the image processing apparatus 200 when returning from the energy-saving mode S2 to the standby mode S1 is explained with reference to FIG. 11. FIG. 11 is a flowchart showing the operation example of the image processing apparatus 200 when returning from the energy-saving mode S2 to the standby mode S1. As shown in FIG. 11, first, the sub CPU 107 detects a return factor (Step S41). When the detected return factor is an authentication request (YES at Step S42), the process moves on to the flow shown in FIG. 8.

On the other hand, when the detected return factor is a factor other than an authentication request (NO at Step S42), the sub CPU 107 determines whether an authentication device was connected to the image processing apparatus 200 in the past with reference to the connection information stored in the NVRAM 140 (Step S43). When an authentication device was connected in the past (YES at Step S43), the sub CPU 107 determines whether the authentication device is currently connected to the image processing apparatus 200 (Step S44). When the authentication device is not currently connected (NO at Step S44), i.e., when the authentication device used in user authentication was connected in the past but is not currently connected to the image processing apparatus 200, the sub CPU 107 controls power supplied to the operation-unit CPU 115 so that the operation-unit CPU 115 goes into operable state. This activates the operation-unit CPU 115 (Step S45).

Figure 12:
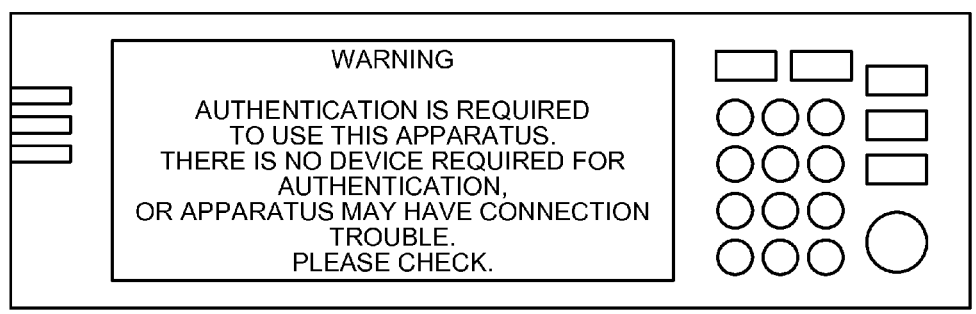
FIG. 12 is a diagram showing an example of a warning message.

After the Step S45, the activated operation-unit CPU 115 initiates a return process for returning the operation panel 114 to operable state. FIG. 12 is a diagram showing an example of the warning message.

To return to FIG. 11, at the Step S43, when no authentication device was connected to the image processing apparatus 200 in the past (NO at Step S43) or at the Step S44, when the authentication device is currently connected to the image processing apparatus 200 (YES at Step S44), the sub CPU 107 controls power supplied to the operation-unit CPU 115 so that the operation-unit CPU 115 goes into operable state. This activates the operation-unit CPU 115 (Step S48).

Figure 13:
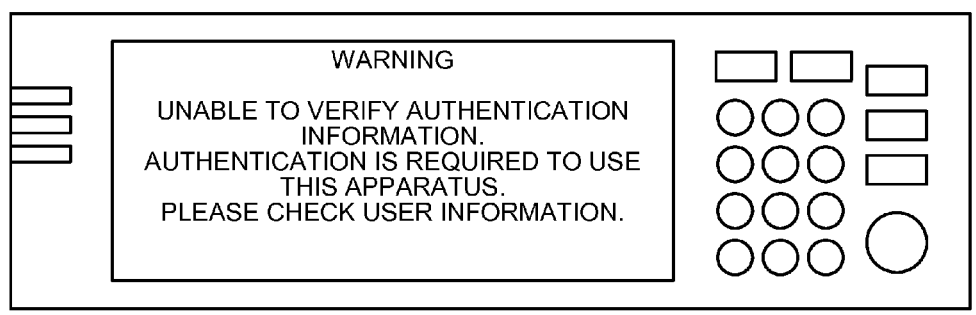
FIG. 13 is a diagram showing an example of an authentication request message.

After Step S48, the activated operation-unit CPU 115 initiates a return process for returning the operation panel 114 to operable state. More specifically, the operation-unit CPU 115 performs a kernel activating process (Step S49). Then, after the transition to the operation-only mode S3, the operation-unit CPU 115 performs control for displaying information prompting the authentication of a user (an authentication request message) on the display unit 117 (Step S50). FIG. 13 is a diagram showing an example of the authentication request message.

Variation 2 of Second Embodiment

Furthermore, for example, when the sub CPU 107 has detected an authentication request as a factor of return from the energy-saving mode S2 to the standby mode S1, first, the sub CPU 107 can perform an authentication process to authenticate a user. When the user is successfully authenticated in the authentication process, the sub CPU 107 controls power supplied to the operation-unit CPU 115 so that only the operation-unit CPU 115 out of the main CPU 103 and the operation-unit CPU 115 goes into operable state. Then, when the operation panel 114 has gone into operable state, the operation-unit CPU 115 controls the operation panel 114 to display information prompting selection of a function that the user wants to use from multiple functions other than the operation panel 114 (such as functions of the image reading unit 120, the image forming unit 121, and the FAX 122). Then, when having accepted input of selection of a function made by the user, the sub CPU 107 controls power supplied to the main CPU 103 so that the main CPU 103 goes into operable state, and also controls power supplied to a unit of the image processing apparatus 200 other than the operation panel 114 (such as the image reading unit 120, the image forming unit 121, or the FAX 122) depending on the selected function.

On the other hand, when the user is not successfully authenticated in the authentication process, the sub CPU 107 controls power supplied to the operation-unit CPU 115 so that only the operation-unit CPU 115 out of the main CPU 103 and the operation-unit CPU 115 goes into operable state. Then, when the operation panel 114 has gone into operable state, the operation-unit CPU 115 controls the operation panel 114 to display an authentication request message on the display unit 117.

Figure 14:
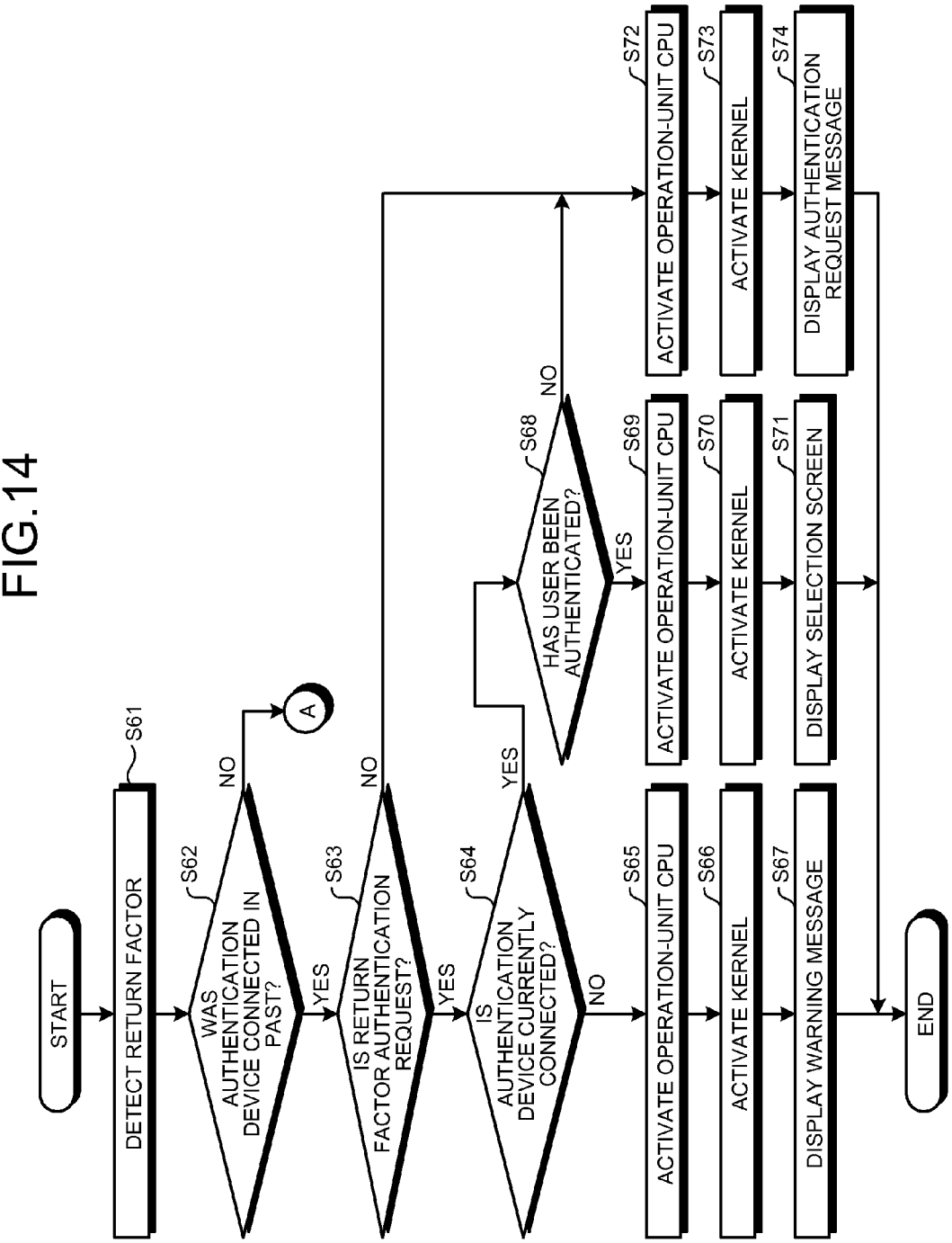
FIG. 14 is a flowchart for explaining an operation example of the image processing apparatus when returning from the energy-saving mode to the standby mode.

Subsequently, an operation example of the image processing apparatus 200 when returning from the energy-saving mode S2 to the standby mode S1 is explained with reference to FIG. 14. FIG. 14 is a flowchart showing the operation example of the image processing apparatus 200 when returning from the energy-saving mode S2 to the standby mode S1. As shown in FIG. 14, first, the sub CPU 107 detects a return factor (Step S61). Then, the sub CPU 107 determines whether an authentication device was connected to the image processing apparatus 200 in the past with reference to the connection information stored in the NVRAM 140 (Step S62). When no authentication device was connected in the past (NO at Step S62), the process moves on to the flow shown in FIG. 8.

On the other hand, when an authentication device was connected in the past (YES at Step S62), the sub CPU 107 determines whether the return factor detected at Step S61 is an authentication request (Step S63). When the return factor detected at Step S61 is an authentication request (YES at Step S63), the sub CPU 107 determines whether the authentication device is currently connected to the image processing apparatus 200 (Step S64). When the authentication device is not currently connected (NO at Step S64), i.e., when the authentication device used in user authentication was connected in the past but is not currently connected to the image processing apparatus 200, the sub CPU 107 controls power supplied to the operation-unit CPU 115 so that the operation-unit CPU 115 goes into operable state. This activates the operation-unit CPU 115 (Step S65).

After the Step S65, the activated operation-unit CPU 115 initiates a return process for returning the operation panel 114 to operable state. More specifically, the operation-unit CPU 115 performs a kernel activating process (Step S66). Then, after the transition to the operation-only mode S3, the operation-unit CPU 115 performs control for displaying a warning message on the display unit 117 (Step S67).

On the other hand, at the Step S64, when having determined that the authentication device is currently connected (YES at Step S64), the sub CPU 107 initiates an authentication process. Then, when a user has been authenticated in the authentication process (YES at Step S68), the sub CPU 107 controls power supplied to the operation-unit CPU 115 so that the operation-unit CPU 115 goes into operable state. This activates the operation-unit CPU 115 (Step S69).

Figure 15:
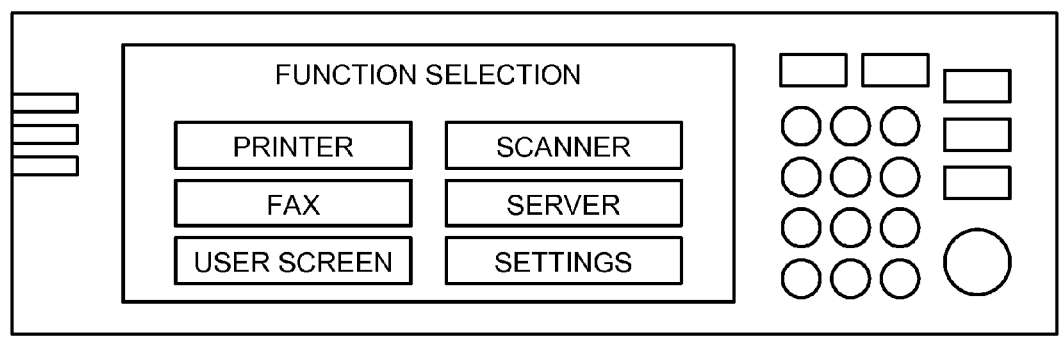
FIG. 15 is a diagram showing an example of a selection screen.

After the Step S69, the activated operation-unit CPU 115 initiates a return process for returning the operation panel 114 to operable state. More specifically, the operation-unit CPU 115 performs a kernel activating process (Step S70). Then, after the transition to the operation-only mode S3, the operation-unit CPU 115 performs control for displaying a selection screen, which prompts selection of a function that the user wants to use from multiple functions other than the operation panel 114, on the display unit 117 (Step S71). FIG. 15 is a diagram showing an example of the selection screen. In this state, when input of selection of, for example, a "FAX" function has been accepted, the sub CPU 107 controls power supplied to the main CPU 103 so that the main CPU 103 goes into operable state, and also performs control for supplying power to the FAX 122. In this manner, in the present variation, power is supplied to a part depending on a function that a user wants to use; therefore, unnecessary power consumption can be further reduced.

In addition, in the present variation, a user selects a function that he wants to use; however, selection of a function is not limited to this, and, for example, designation information that designates a function to be preferentially returned can be stored in the NVRAM 140 in advance. In this configuration, when a user has been authenticated in the authentication process (YES at Step S68), the sub CPU 107 can be configured to control power supplied to the main CPU 103 and the operation-unit CPU 115 so that the main CPU 103 and the operation-unit CPU 115 go into operable state and control power supplied to a unit of the image processing apparatus 200 other than the operation panel 114 (such as the image reading unit 120, the image forming unit 121, or the FAX 122) depending on a function indicated by the designation information stored in the NVRAM 140.

To return to FIG. 14, when a user has not been authenticated in the authentication process (NO at Step S68), the sub CPU 107 controls power supplied to the operation-unit CPU 115 so that the operation-unit CPU 115 goes into operable state. This activates the operation-unit CPU 115 (Step S72). In short, in the second embodiment and the variations of the second embodiment, when the sub CPU 107 has detected an authentication request, which requests to authenticate a user, as a factor of return from the energy-saving mode S2 to the standby mode S1, the sub CPU 107 performs a user authentication process, and if the user authentication fails in the authentication process, controls power supplied to the operation-unit CPU 115 so that only the operation-unit CPU 115 out of the main CPU 103 and the operation-unit CPU 115 goes into operable state, and then when the operation panel 114 (corresponding to a "predetermined controlled unit" in claims) has gone into operable state, the operation-unit CPU 115 controls the operation panel 114 to display information prompting the authentication of the user.

After the Step S72, the activated operation-unit CPU 115 initiates a return process for returning the operation panel 114 to operable state. More specifically, the operation-unit CPU 115 performs a kernel activating process (Step S73). Then, after the transition to the operation-only mode S3, the operation-unit CPU 115 performs control for displaying information prompting the authentication of the user (an authentication request message) on the display unit 117 (Step S74).

Variation 3 of Second Embodiment

Figure 16:
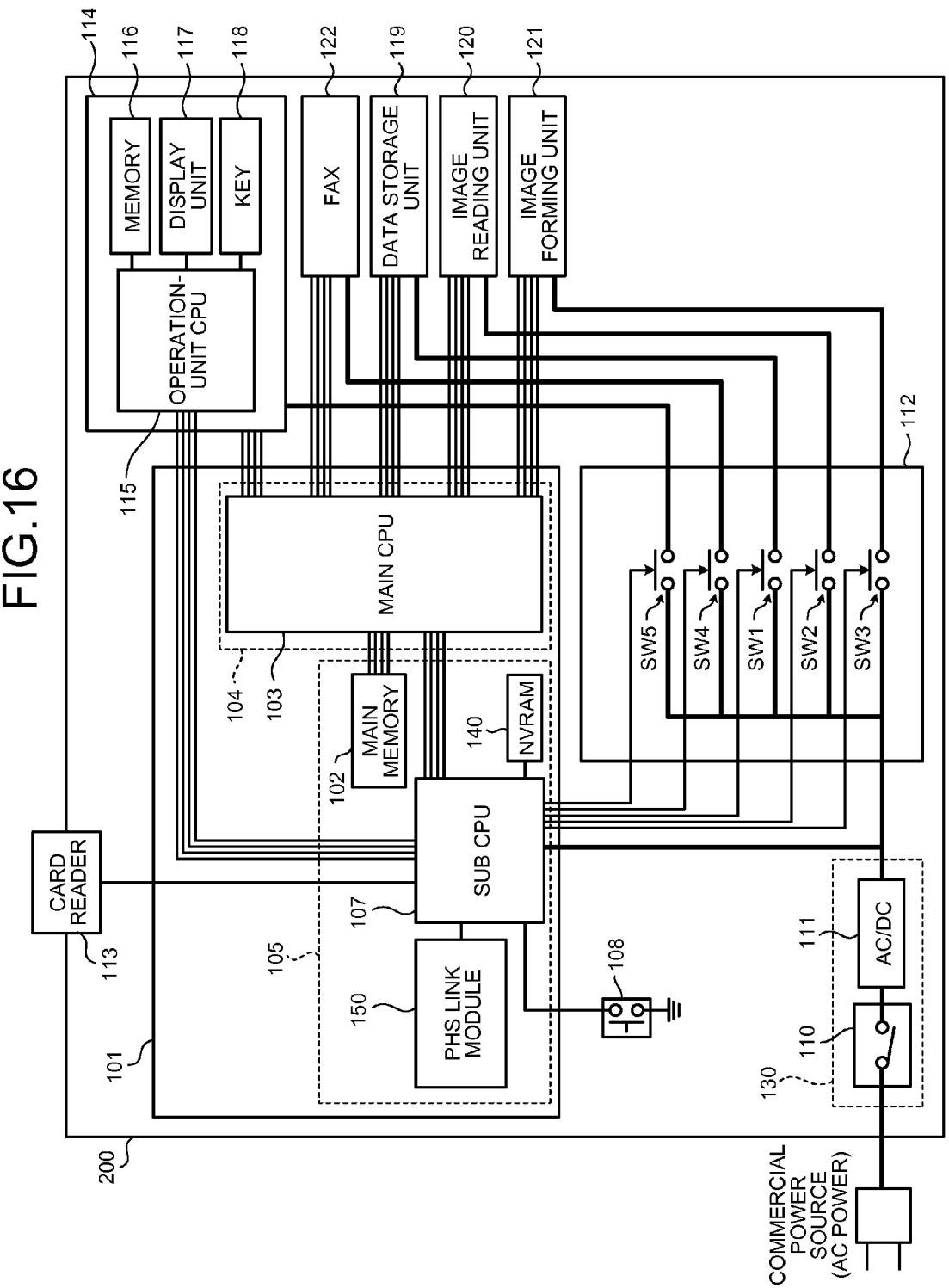
FIG. 16 is a diagram showing a configuration example of an image processing apparatus according to a variation of the second embodiment.

For example, as shown in FIG. 16, the sub CPU 107 can be connected to a PHS link module 150 instead of the Ethernet PHY 106. In the example shown in FIG. 16, the sub CPU 107 communicates with the external server device 123 via a PHS line.

In addition, a program executed by the above-described image processing apparatus (100, 200) can be provided in such a manner that the program is recorded on a computer-readable recording medium, such as a CD-ROM, a flexible disk (FD), a CD-R, or a digital versatile disk (DVD), in an installable or executable file format.

Furthermore, the program executed by the above-described image processing apparatus (100, 200) can be provided in such a manner that the program is stored on a computer connected to a network such as the Internet so that a user can download the program over the network. Moreover, the program executed by the above-described image processing apparatus (100, 200) can be provided or distributed via a network such as the Internet.

The program according to the present invention can be considered a program causing a computer equipped with a first processor for controlling the operation of a predetermined controlled unit and a second processor for controlling the operation of units other than the predetermined controlled unit to execute a step of putting a process related to the first processor before a process related to the second processor in a second mode in which respective amounts of power supplied to the first and second processors are lower than that in in a first mode in which the first and second processors are operable until the transition to a third mode in which respective amounts of power supplied to the first and second processors are an amount between that in the first mode and that in the second mode and at least the predetermined controlled unit is operable.

The embodiments of the present invention are explained above; however, the above-described embodiments are provided as examples and are not intended to limit the scope of the invention. The present invention is not limited to the above-described embodiments as they are, and can be embodied by making modifications in components without departing from the scope of the invention in the implementation phase. Furthermore, various inventions can be created by appropriate combinations of multiple components disclosed in the above-described embodiments. For example, some components can be removed from the configuration of the apparatuses disclosed in the above-described embodiments.

Examples of modifications are described below. The above-described embodiments and the following modifications can be arbitrarily combined.

(1) Modification 1

For example, in the energy-saving mode S2, the main CPU 103 and the operation-unit CPU 115 can be configured to go into STR (Suspend To RAM) mode. More specifically, it can be configured that in the energy-saving mode S2, while the sub CPU 107 (the power control unit) performs control for shutting off the power supply to the main CPU 103 and the operation-unit CPU 115, the sub CPU 107 performs control for supplying power to the main memory 102 holding therein a program expanded by the main CPU 103 as it is and the memory 116 holding therein a program expanded by the operation-unit CPU 115 as it is. According to this configuration, the programs are kept expanded in the main memory 102 and the memory 116, and therefore it is possible to reduce the time required to return from the energy-saving mode S2.

(2) Modification 2

In the above-described embodiments, the operation-only mode S3 is provided as a state during the return from the energy-saving mode S2 to the standby mode S1; however, it is not limited to this, and, for example, the operation-only mode S3 can be provided independently. In this configuration, conditions of transition, for example, from the energy-saving mode S2 to the operation-only mode S3 include, for example, acceptance of input of selection (designation) of the operation-only mode S3 made by user operation on the operation panel 114, receipt of information indicating that it is time to make the transition to the operation-only mode S3 from the timer (not shown), and the like. When any of the conditions of the transition from the energy-saving mode S2 to the operation-only mode S3 is met, while the sub CPU 107 controls power supplied to the operation panel 114 so that the operation panel 114 becomes operable, the sub CPU 107 can control power supplied to the units of the image processing apparatus 100 other than the operation panel 114 to be the same state as in the energy-saving mode S2.

Furthermore, conditions of transition, for example, from the operation-only mode S3 to the standby mode S1 include, for example, acceptance of input of selection (designation) of the standby mode S1 made by user operation on the operation panel 114, receipt of information indicating that it is time to make the transition to the standby mode S1 from the timer (not shown), and the like. When any of the conditions of the transition from the operation-only mode S3 to the standby mode S1 is met, the sub CPU 107 controls power supplied to the units of the image processing apparatus 100 so that the units of the image processing apparatus 100 become operable.

In addition, from the viewpoint of reduction of power consumption, power consumption of the main CPU 103 in the energy-saving mode S2 is preferably kept as low as possible; therefore, the sub CPU 107 can be configured to perform control for shutting off the power supply to the main CPU 103 in both the energy-saving mode S2 and the operation-only mode S3. Namely, when the state is returned from the energy-saving mode S2 to the operation-only mode S3, only the operation panel 114 is returned to operable state, thereby enabling a user to make a minimum operation, and the main CPU 103 is activated if needed, thereby enabling the more precise power control. The minimum operation includes, for example, an operation to change the setting of the apparatus, an operation to use a web browser, and an operation to use an application that can be executed through the operation panel 114 only.

(3) Modification 3

Figure 17:
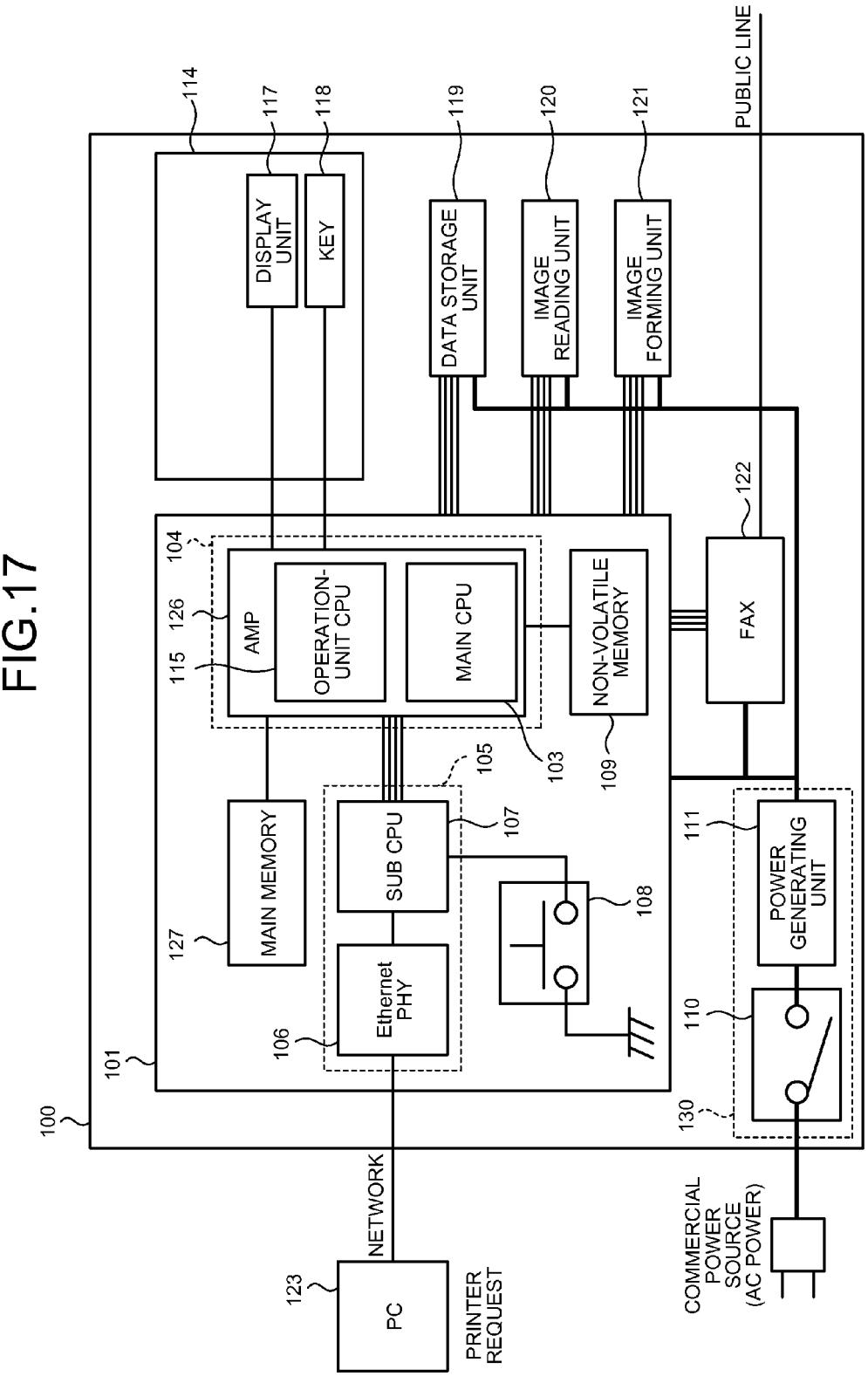
FIG. 17 is a diagram showing a configuration example of an image processing apparatus according to a modification of the embodiments.

For example, the main CPU 103 and the operation-unit CPU 115 can be composed of a multiprocessor. Conventionally, a technology of AMP (Asymmetric Multiple Processor) is known. The AMP is a technology that one CPU device physically has multiple CPU cores, and the CPU cores can operate different operating systems (OS), respectively. By applying this AMP technology to the main CPU 103 and the operation-unit CPU 115 in the present embodiments, the main CPU 103 and the operation-unit CPU 115 can be realized by physically one CPU, and physically one memory can be used as a memory for the main CPU 103 and a memory for the operation-unit CPU 115. FIG. 17 shows an example of this configuration. In the example shown in FIG. 17, the main CPU 103 and the operation-unit CPU 115 are realized by one CPU 126 installed in the controller 101, and a main memory 127 is a memory shared by the main CPU 103 and the operation-unit CPU 115. In this case, a CPU core that realizes the function of the main CPU 103 can be considered to correspond to the "second processor" in claims, and a CPU core that realizes the function of the operation-unit CPU 115 can be considered to correspond to the "first processor" in claims. In short, the first and second processors can be composed of a multiprocessor. Furthermore, in this configuration, the image processing apparatus can further include a third storage unit (in this example, the main memory 127) that stores therein a program executed by the first processor and a program executed by the second processor. In addition, as one configuration of the multiprocessor, for example, there is a system-on-chip (SoC) including a specific circuit. In the example shown in FIG. 17, the CPU 126 can be realized by an SoC.

(4) Modification 4

Figure 18:
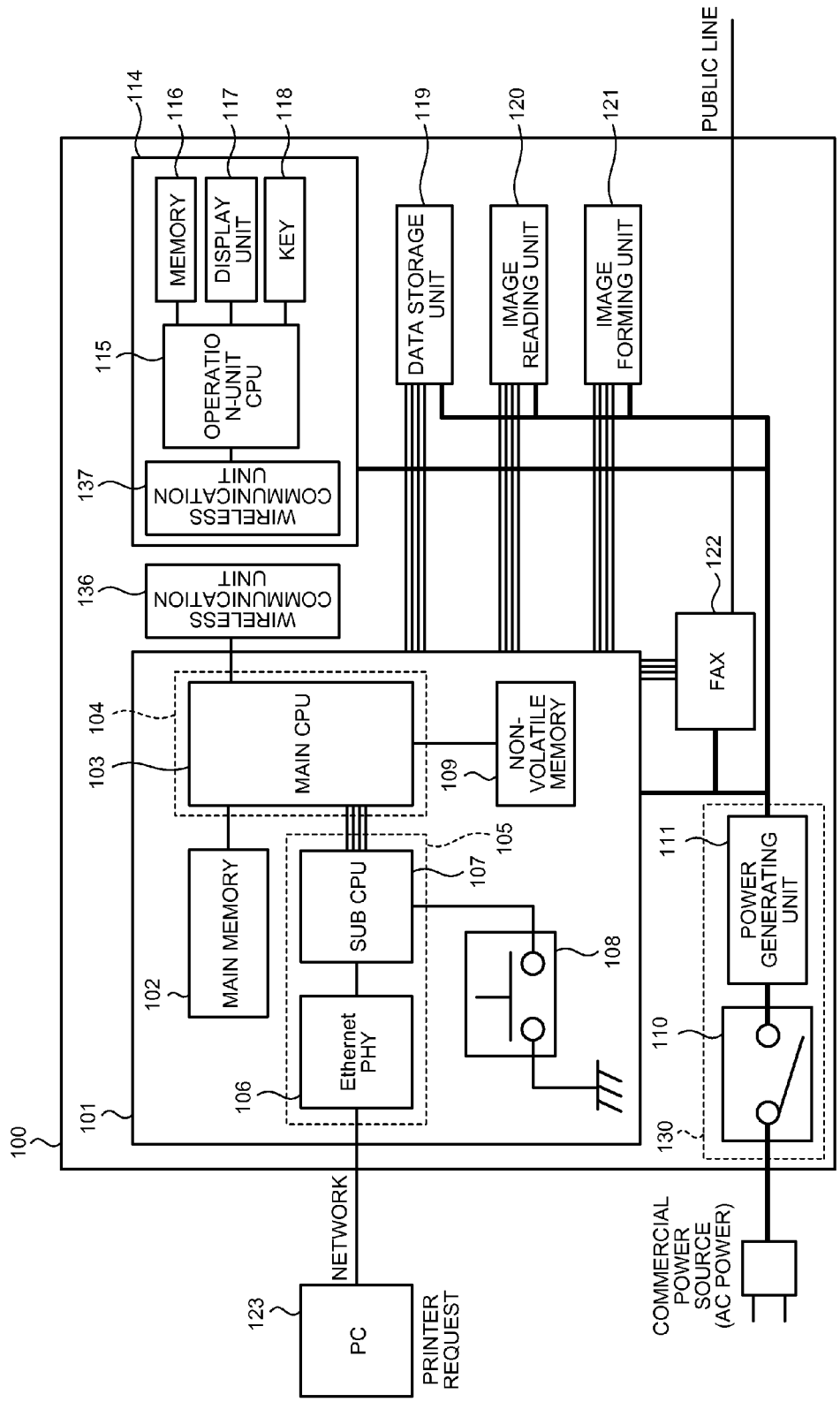
FIG. 18 is a diagram showing a configuration example of an image processing apparatus according to another modification of the embodiments.

For example, the operation panel 114 equipped with the operation-unit CPU 115 can be connected to the main CPU 103 via wireless communication. In an example shown in FIG. 18, the image processing apparatus 100 includes a wireless communication unit 136 placed on the side of the main CPU 103 and a wireless communication unit 137 placed on the side of the operation-unit CPU 115, and communication between the main CPU 103 and the operation-unit CPU 115 (the operation panel 114) is established by wireless; therefore, there is no need for internal data wiring, so that it is possible to achieve reduction in cost and weight. In addition, wireless connection systems include a wireless LAN, Bluetooth (registered trademark), and Zigbee (registered trademark), etc. In short, the controlled unit equipped with the first processor can be connected to the second processor via wireless communication.

As communication between the main CPU 103 and the operation panel 114 is established by wireless connection, it is possible to adopt a configuration that the operation panel 114 can be independently provided separately from the image processing apparatus 100 as shown in FIG. 19. The operation panel 114 in FIG. 19 can be composed of mobile terminals (such as a tablet computer, a smartphone, and a notebook PC), and these can be used as an operation unit of the image processing apparatus 100; therefore, a user can input operation remotely, and the user-friendliness can be improved. In an example shown in FIG. 19, the operation panel 114 includes a charging circuit 124 and a battery 125, and the operation panel 114 operates by receiving the supply of power stored in the battery 125 (battery power).

According to the present invention, it is possible to accelerate the activation of the predetermined controlled unit, thereby reducing power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising: a first processor configured to control operation of a predetermined controlled unit;

a second processor configured to control operation of units of the information processing apparatus other than the predetermined controlled unit; and a power supply unit configured to supply power from a power source to the first and second processors; and a sub controller configured to control supply of power from the power supply unit to the first processor and the second processor:

wherein the sub controller is configured to determine whether an authentication device is currently connected to the information processing apparatus when an authentication request is received at the sub controller and to activate operation of the first processor and the first processor performs control for displaying a warning message when the authentication device is not connected to the information processing apparatus.

2. The information processing apparatus according to claim 1, further comprising:
a first storage unit configured to have a working area where the first processor execute a program;
a second storage unit configured to have a working area where the second processor execute a program, wherein the first processor and the second processor are connected to one another and are configured to operate in a first mode, a second mode, and a third mode, in the first mode the first processor and second processor are operable respectively, in the second mode respective amounts of power supplied to the first and second processors are lower than that in the first mode, in the third mode respective amounts of power supplied to the first and second processors are an amount between that in the first mode and that in the second mode and at least the predetermined controlled unit is operable, and in the second mode, the first processor puts a process related to the first processor before a process related to the second processor until the second mode is transitioned to the third mode, and wherein
in the second mode, while the sub control unit performs control for shutting off the power supply to the first and second processors, the sub controller performs control for supplying power to the first and second storage units that hold therein expanded programs.

3. The information processing apparatus according to claim 2, wherein
in the third mode, the sub control unit shuts off the power supply to the second processor.

4. The information processing apparatus according to claim 2, wherein
when the sub controller has detected an authentication request for authentication of a user as a factor of return from the second mode to the first mode, the sub control unit controls power supplied to the first and second processors so that the first and second processors go into operable state, and performs authentication of the user.

5. The information processing apparatus according to claim 4, wherein
when the sub controller has detected a factor other than the authentication request as a factor of return from the second mode to the first mode, the sub controller controls power supplied to the first processor so that only the first processor out of the first and second processors goes into operable state.

6. The information processing apparatus according to claim 5, wherein
when the predetermined controlled unit has gone into operable state, the first processor performs control for displaying information prompting authentication of the user.

7. The information processing apparatus according to claim 5, wherein
when an authentication device used in authentication of the user was connected in the past but is not currently connected to the information processing apparatus, the sub controller causes the first processor to display a warning.

8. The information processing apparatus according to claim 2, wherein
upon detection of an authentication request for authentication of a user as a mode return factor, the information processing apparatus performs authentication of the user, and, when the user is successfully authenticated in the authentication, controls power supplied to the first processor so that only the first processor out of the first and second processors goes into an operable state, and when the predetermined controlled unit has gone into the operable state, the first processor performs control for displaying information prompting selection of a function that the user wants to use from multiple functions other than the predetermined controlled unit.

9. The information processing apparatus according to claim 8, wherein
upon acceptance of input of selection of a function made by the user, the sub controller performs control for supplying power to the second processor so that the second processor goes into the operable state, and also performs control for supplying power to a unit other than the predetermined controlled unit depending on the selected function.

10. The information processing apparatus according to claim 2, further comprising a non-volatile memory for storing therein designation information that designates a function to be preferentially returned out of multiple functions other than the predetermined controlled unit, wherein
when the sub controller has detected an authentication request for authentication of a user as a factor of return from the second mode to the first mode, the sub controller performs authentication of the user, and, when the user is successfully authenticated in the authentication, controls power supplied to the first and second processors so that the first and second processors go into an operable state, and performs control for supplying power to a unit other than the predetermined controlled unit depending on the designation information.

11. The information processing apparatus according to claim 3, wherein
when the sub controller has detected an authentication request for authentication of a user as a factor of return from the second mode to the first mode, the sub controller controls power supplied to the first and second processors so that the first and second processors go into an operable state, and performs authentication of the user.

12. The information processing apparatus according to claim 11, wherein
when the sub controller has detected a factor other than the authentication request as a factor of return from the second mode to the first mode, the sub controller controls power supplied to the first processor so that only the first processor out of the first and second processors goes into the operable state.

13. The information processing apparatus according to claim 12, wherein
when the predetermined controlled unit has gone into the operable state, the first processor performs control for displaying information prompting authentication of the user.

14. The information processing apparatus according to claim 12, wherein
when the authentication device used in authentication of the user was connected in the past but is not currently connected to the information processing apparatus, the sub controller causes the first processor to display a warning.

15. The information processing apparatus according to claim 3, wherein
upon detection of an authentication request for authentication of a user as a mode return factor, the information processing apparatus performs authentication of the user, and, when the user is successfully authenticated in the authentication, controls power supplied to the first processor so that only the first processor out of the first and second processors goes into an operable state, and when the predetermined controlled unit has gone into operable state, the first processor performs control for displaying information prompting selection of a function that the user wants to use from multiple functions other than the predetermined controlled unit.

16. The information processing apparatus according to claim 15, wherein
upon acceptance of input of selection of a function made by the user, the sub controller performs control for supplying power to the second processor so that the second processor goes into the operable state, and also performs control for supplying power to a unit other than the predetermined controlled unit depending on the selected function.

17. The information processing apparatus according to claim 3, further comprising a non-volatile memory for storing therein designation information that designates a function to be preferentially returned out of multiple functions other than the predetermined controlled unit, wherein
when the sub controller has detected an authentication request for authentication of a user as a factor of return from the second mode to the first mode, the sub controller performs authentication of the user, and, when the user is successfully authenticated in the authentication, controls power supplied to the first and second processors so that the first and second processors go into an operable state, and performs control for supplying power to a unit other than the predetermined controlled unit depending on the designation information.

18. The information processing apparatus according to claim 1, further comprising a first wireless communication unit is operationally connected to the first processor and a second wireless communication unit is operationally connected to the second processor.

19. The information processing apparatus according to claim 1, wherein the predetermined controlled unit remotely located from the information processing apparatus.

20. The information processing apparatus according to claim 1, wherein the predetermined control unit includes a battery and operates by receiving the supply of power stored in the battery.

* * * * *